United States Patent
Glomski et al.

(10) Patent No.: US 11,959,773 B2
(45) Date of Patent: Apr. 16, 2024

(54) ALL-ENGINE-OUT AIRCRAFT GUIDANCE TO RUNWAY

(71) Applicant: HONEYWELL INTERNATIONAL INC., Morris Plains, NJ (US)

(72) Inventors: Bill E. Glomski, Scottsdale, AZ (US);
Adib Bouanani, Laveen, AZ (US);
Raymond Seuss, Cave Creek, AZ (US);
Dominic Lammers, Phoenix, AZ (US);
Thomas Slotter, Glendale, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 521 days.

(21) Appl. No.: 16/901,943

(22) Filed: Jun. 15, 2020

(65) Prior Publication Data
US 2021/0088356 A1 Mar. 25, 2021

Related U.S. Application Data

(60) Provisional application No. 62/905,727, filed on Sep. 25, 2019.

(51) Int. Cl.
*G01C 23/00* (2006.01)
*B64D 43/00* (2006.01)

(52) U.S. Cl.
CPC .......... *G01C 23/005* (2013.01); *B64D 43/00* (2013.01)

(58) Field of Classification Search
CPC ...... G01C 23/005; G01C 23/00; B64D 43/00; B64D 2045/0085; B64D 45/04; G05D 1/0676; G05D 1/105; G08G 5/0021; G08G 5/0056; G08G 5/025

USPC .......................................................... 701/16
See application file for complete search history.

(56) References Cited

U.S. PATENT DOCUMENTS

| | | |
|---|---|---|
| 8,543,264 B1 | 9/2013 | Tomas |
| 9,310,222 B1 | 4/2016 | Suiter et al. |
| 10,202,204 B1 * | 2/2019 | Daidzic ............... B64C 5/02 |
| 10,242,582 B1 | 3/2019 | Ogden et al. |
| 2007/0129855 A1 | 6/2007 | Coulmeau |
| 2014/0343765 A1 * | 11/2014 | Suiter ............... B64D 45/08 701/18 |
| 2014/0365041 A1 * | 12/2014 | Deker ............... G08G 5/0039 701/4 |

(Continued)

FOREIGN PATENT DOCUMENTS

| | | | |
|---|---|---|---|
| CN | 106394922 A | 2/2017 | |
| WO | WO-2012145608 A1 * | 10/2012 | ........... G05D 1/0055 |

*Primary Examiner* — Maceeh Anwari
(74) *Attorney, Agent, or Firm* — Lorenz & Kopf LLP

(57) ABSTRACT

A system and method for determining a lateral and vertical path for aircraft guidance from a current aircraft position to a landing runway following a complete loss of engine thrust includes determining, in a processing system, a final approach segment, a deceleration segment, and a driftdown segment. Connecting, in the processing system, the driftdown segment to the deceleration segment, and the deceleration segment to the final approach segment, to form a complete lateral and vertical path from the current aircraft position to the landing runway. And rendering, on a display device, a graphical representation of the complete lateral and vertical path from the current aircraft position to the landing runway, wherein the graphical representation of the complete lateral and vertical path updates as the aircraft travels.

19 Claims, 20 Drawing Sheets

(56) References Cited

U.S. PATENT DOCUMENTS

2017/0162062 A1    6/2017  Kushwaha
2017/0249852 A1*  8/2017  Haskins ............... G08G 5/0086

* cited by examiner

ALL-ENGINE-OUT AIRCRAFT GUIDANCE TO RUNWAY

CROSS-REFERENCE TO RELATED APPLICATION

The present application claims the benefit of prior filed U.S. Provisional Patent Application No. 62/905,727, filed Sep. 25, 2019, which is hereby incorporated by reference herein in its entirety.

TECHNICAL FIELD

The present disclosure generally relates to aircraft guidance, and more particularly relates to aircraft guidance to a runway following an unlikely complete loss of engine thrust event.

BACKGROUND

Modern business and commercial aircraft have reduced the number of propulsion engines to two units. In the unlikely, yet postulated event that one of the engines fails, the other engine is still available to produce the thrust required to maintain safe flight. The loss of one engine, although unlikely, is postulated to occur. Indeed, it is postulated that events such as, for example, fuel starvation, foreign object ingestion, fuel contamination, fuel freezing, and component failure could compromise the ability of a single jet engine to provide the expected thrust.

Even more unlikely, yet postulated, is a dual engine failure event on a dual engine aircraft (i.e., a complete loss of engine thrust). If such a highly unlikely event were to occur, the time remaining for flight is limited to the kinetic energy and potential energy currently stored in the aircraft in the form of airspeed and altitude, respectively. In order to maintain flight after a postulated dual engine failure, the aircraft must use this energy to maintain normal flight. Since these two sources of energy are very finite, as compared to the mechanical energy produced by an engine, the time remaining for flight is limited.

Hence, there is a need for a system and method that will provide the capability for automated control of an aircraft, and/or generating instructions for manually controlling of the aircraft, to a runway for a controlled landing following a postulated complete loss of engine thrust scenario. The present disclosure addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a method for determining a lateral and vertical path for aircraft guidance from a current aircraft position to a landing runway following a complete loss of engine thrust includes determining, in a processing system, a final approach segment, a deceleration segment, and a driftdown segment. The final approach segment is a path that the aircraft will traverse to maintain aircraft speed at a controlled landing speed until the aircraft touches down on the landing runway. The deceleration segment is a path that the aircraft will traverse, just prior to entering the final approach segment, to reduce the aircraft speed to the controlled landing speed. The driftdown segment is a path that the aircraft will traverse, upon the complete loss of engine thrust and just prior to entering the deceleration segment, to reduce aircraft potential energy to a predetermined magnitude. Connecting, in the processing system, the driftdown segment to the deceleration segment, and the deceleration segment to the final approach segment, to form a complete lateral and vertical path from the current aircraft position to the landing runway. Rendering, on a display device, a graphical representation of the complete lateral and vertical path from the current aircraft position to the landing runway, wherein the graphical representation of the complete lateral and vertical path updates as the aircraft travels.

In another embodiment, a system for determining a lateral and vertical path for aircraft guidance from a current aircraft position to a landing runway following a complete loss of engine thrust includes a display device and a processing system. The processing system is in operable communication with the display device and is configured to: determine a final approach segment, the final approach segment being a path that the aircraft will traverse to maintain aircraft speed at a controlled landing speed until the aircraft touches down on the landing runway; determine a deceleration segment, the deceleration segment being a path that the aircraft will traverse, just prior to entering the final approach segment, to reduce the aircraft speed to the controlled landing speed; determine a driftdown segment, the driftdown segment being a path that the aircraft will traverse, upon the complete loss of engine thrust and just prior to entering the deceleration segment, to reduce aircraft potential energy to a predetermined magnitude; connect the driftdown segment to the deceleration segment, and the deceleration segment to the final approach segment, to form a complete lateral and vertical path from the current aircraft position to the landing runway; and command the display device to render a graphical representation of the complete lateral and vertical path from the current aircraft position to the landing runway, wherein the graphical representation of the complete lateral and vertical path updates as the aircraft travels.

Furthermore, other desirable features and characteristics of the disclosed system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
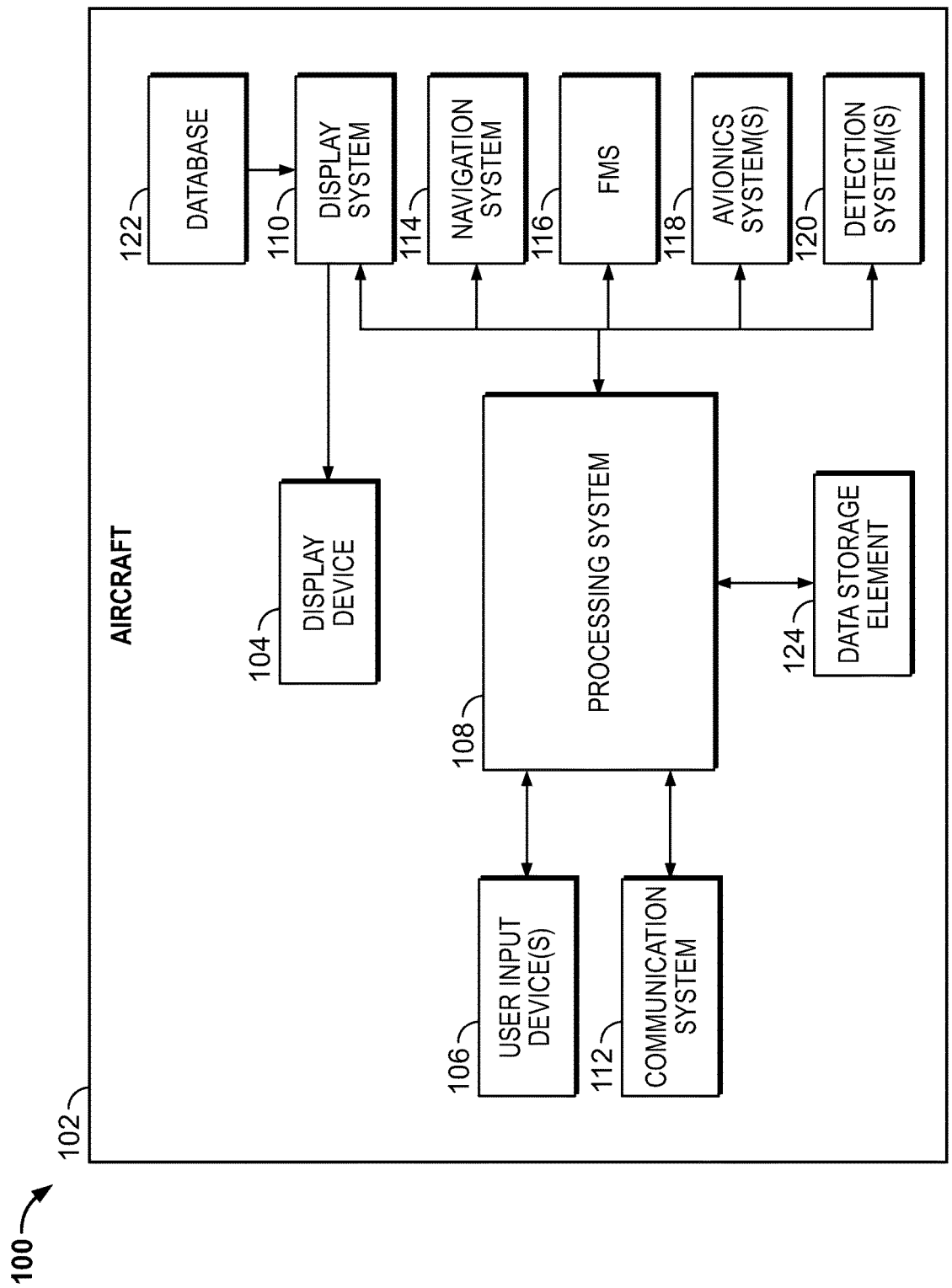
FIG. 1 depicts an example embodiment of a system that may implement all-engine-out guidance for an aircraft.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

The system and method disclosed herein provide the capability for automated control of the aircraft, and/or for generating instructions for manually controlling of the aircraft, to a runway for a controlled landing following a postulated complete loss of engine thrust scenario down to a runway for a controlled landing. The system and method process information, such as aircraft altitude, speed, and position, and use this information to calculate a return to one or more runways within range. The methodology involves three major flight segments that, when combined, produce a flight path that is designed to guide the aircraft from its present position down to short final on a runway. This flight path can be designed to optimize flight endurance (e.g., time-in-air) so that the flight crew has more time to diagnose problems with one or both engines. If one engine can be restarted, then the need for an unpowered landing is no longer necessary.

Before proceeding with the description, it is noted that the following non-exhaustive list of terms covers several technical terms used herein:

Max L/D Speed—The airspeed where the aircraft lift-to-drag ratio is the highest, resulting in the most efficient glide path that maximizes time aloft.

Vertical Margin—This term may be used interchangeably with Energy Margin. It is the distance above a calculated vertical path and is measured from the vertical path up to the aircraft altitude.

Speed on Elevator—This is a system or autopilot control mode that uses aircraft pitch to maintain an airspeed target. If the aircraft speed is above the target, the system will pitch up to reduce airspeed. If the aircraft airspeed is below the target, the system will pitch down to increase airspeed.

Potential Energy—This is the energy stored as aircraft altitude.

Kinetic Energy—This is the energy stored as aircraft velocity.

Drag—A force in the opposite direction of aircraft motion that works to slow the aircraft. Parts of the aircraft that may cause varying amounts of drag are speed brakes, flaps, landing gear, ram air turbine, and directional change (e.g., higher bank angle causes more wing drag).

An aircraft moves through several flight phases during a typical flight. These flight phases include, for example, departure, cruise, and arrival. The system and method described herein provides guidance in each of these flight phases. Each phase of flight has unique characteristics that should be considered during a postulated total loss of engine thrust event (e.g., dual engine failure).

A total loss of engine thrust event leaves the flight crew with limited time and options. The disclosed system and method can assist the pilot in making a decision quickly after the event. In some embodiments, a display may provide the pilot a relatively quick indication if a solution is available. If one or more solutions are available, each solution can be accessed and activated by the pilot within several seconds. If, however, a solution is not available, the display may also provide this information to the pilot. Even if a solution for return to a runway is not available, this can still be valuable information, and the pilot can avoid efforts to find a runway and instead plan for another method of landing.

During a complete loss of engine thrust event, the flight crew will have many tasks to perform in addition to flying the plane. These tasks include, for example, air traffic control (ATC) communications, passenger preparation, and problem troubleshooting. Of these, the major task is flying the plane. With high demand to manage the direction, speed, energy, configuration, and drag of the aircraft, it would take considerable effort and time that could be used for other tasks. This process is not well suited to human ability, and may be worsened by panic, confusion, or poor weather. Indeed, the physical flight characteristics of an aircraft without thrust are unique—flap deployment schedule, landing gear extension point, increased aircraft drag, etc. This system and method disclosed herein is designed to manage these changes in a way that is simple for the pilot to understand and execute in a high stress situation. The system and method disclosed herein creates a 3-dimensional (3D) path in space that is specially suited to handle a total loss of engine thrust event. This 3D path is computed based on current, real-world inputs and aircraft physics, and is displayed to the pilot in a way that gives immediate information regarding the aircraft energy condition. The pilot can use this 3D path as a reference for manual flight, or the pilot may choose to relinquish control to the flight computer for a fully automated precision return to the runway.

In a complete loss of engine thrust condition, the main goal of the pilot is to safely land the aircraft. This is best done on a runway that satisfies the landing requirements of the aircraft. In order to achieve this, two factors should be met. First, the aircraft must be able to reach the runway. And second, the aircraft must be able to stop on the runway. In a complete loss of engine thrust condition, several factors can affect the pilot's ability to meet these goals. These factors include:

Reverse thrust—In a complete loss of engine thrust condition, engines will not be available to slow the aircraft on the runway. This can affect the ability of the aircraft to stop on the runway.

Weight—If the aircraft loses thrust while heavy, the pilot will be forced to land the aircraft overweight. This can affect the ability to stop on the runway. Fuel dumping is not a viable option, as the remaining time airborne is limited.

Wind—The pilot may be forced to land with a headwind or tailwind. A headwind may affect the ability to reach the runway, while a tailwind may affect the ability to stop on the runway.

Flap Deployment—Flaps create lift and cause drag, and if not deployed at the correct time can result in the aircraft not reaching the runway.

Landing Gear Deployment—Landing gear can cause a high amount of drag. If deployed too early, the aircraft may not reach the runway.

Missed Approach—In a normal landing, with available thrust, the pilot has the option of performing a missed approach if there are problems. This can also be performed with a single operational engine. In a complete loss of engine thrust condition, a missed approach is not an option. Therefore, only one approach is available to the pilot, and it must be correct to satisfy the goals above and ensure a safe landing.

Thrust Derates—If thrust is derated during takeoff and/or climb, it can affect the energy available to return to a runway after departure.

The methodology described herein can be applied during multiple phases of flight such as takeoff, climb-out, cruise, arrival, certain parts of approach, and missed approach. If possible, the best outcome is to start one or both engines. With thrust restored, there is no longer an immediate need to land the aircraft.

The herein described methodology is designed to maximize the time in the air after a complete loss of engine thrust event. This allows more time for the crew to diagnose problems, and possibly restart an engine. This is achieved by limiting aircraft drag during the return to the runway. Drag in the form of speed brakes, flaps, and landing gear are all delayed for as long as possible. This provides more energy to maximize time in the air.

The priority of this methodology is to provide a safe return to a runway in the event of a complete loss of engine thrust event, and is intended to provide at least the following:

Maximize Time Aloft—Create extra time to troubleshoot problems and prepare for landing.

Reduce Crew Workload—Automate the control of the aircraft so that the crew can focus on other items.

Precision Approach—Position the aircraft laterally and vertically on final approach. Airspeed at or above minimum speeds. Aircraft configured for landing, flaps, and landing gear. To do so, the methodology preferably conserves energy to ensure that the runway is reached, and will prioritize a faster landing speed over a slower landing speed. The methodology will preferably control excess velocity to avoid a runway overrun.

Aircraft System Overview

Turning now to FIG. 1, one example embodiment of an aircraft system 100 that may implement complete loss of engine thrust guidance for an aircraft 102 is depicted. The depicted aircraft system 100 includes, without limitation, a display device 104, a user input device 106, a processing system 108, a display system 110, a communications system 112, a navigation system 114, a flight management system (FMS) 116, one or more avionics systems 118, one or more detection systems 120, and one or more data storage elements 122, 124 cooperatively configured to support operation of the aircraft system 100, as described in greater detail below.

In exemplary embodiments, the display device 104 is realized as an electronic display capable of graphically displaying flight information or other data associated with operation of the aircraft 102 under control of the display system 110 and/or processing system 108. In this regard, the display device 104 is coupled to the display system 110 and the processing system 108, and the processing system 108 and the display system 110 are cooperatively configured to display, render, or otherwise convey one or more graphical representations or images associated with operation of the aircraft 102 on the display device 104, as described in greater detail below. The display device 104 may be any one or more of numerous head-up displays or head down displays.

The user input device 106 is coupled to the processing system 108, and the user input device 106 and the processing system 108 are cooperatively configured to allow a user (e.g., a pilot, co-pilot, or crew member) to interact with the display device 104 and/or other elements of the aircraft system 100. Depending on the embodiment, the user input device 106 may be realized as a keypad, touchpad, keyboard, mouse, touch panel (or touchscreen), joystick, knob, line select key or another suitable device adapted to receive input from a user.

The processing system 108 generally represents the hardware, circuitry, processing logic, and/or other components configured to facilitate communications and/or interaction between the elements of the aircraft system 100 and perform additional processes, tasks and/or functions to support operation of the aircraft system 100, as described in greater detail below. Depending on the embodiment, the processing system 108 may be implemented or realized with a general purpose processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. In practice, the processing system 108 includes processing logic that may be configured to carry out the functions, techniques, and processing tasks associated with the operation of the aircraft system 100 described in greater detail below. Furthermore, the steps of a method or algorithm described in connection with the embodiments disclosed herein may be embodied directly in hardware, in firmware, in a software module executed by the processing system 108, or in any practical combination thereof. In accordance with one or more embodiments, the processing system 108 includes or otherwise accesses a data storage element, such as a memory (e.g., RAM memory, ROM memory, flash memory, registers, a hard disk, or the like) or another suitable non-transitory short or long term storage media capable of storing computer-executable programming instructions or other data for execution that, when read and executed by the processing system 108, cause the processing system 108 to execute and perform one or more of the processes, tasks, operations, and/or functions described herein.

The display system 110 generally represents the hardware, firmware, processing logic and/or other components configured to control the display and/or rendering of one or more displays pertaining to operation of the aircraft 102 and/or systems 112, 114, 116, 118, 120 on the display device 104 (e.g., synthetic vision displays, navigational maps, a horizontal situation display, a vertical situation display, and the various other elements, which may be described further below). In this regard, the display system 110 may access or include one or more databases 122 suitably configured to support operations of the display system 110, such as, for example, a terrain database, an obstacle database, a navigational database, a geopolitical database, a terminal airspace database, a special use airspace database, or other information for rendering and/or displaying navigational maps and/or other content on the display device 104. In this regard, in addition to including a graphical representation of terrain, a navigational map displayed on the display device 104 may include graphical representations of navigational reference points (e.g., waypoints, navigational aids, distance measuring equipment (DMEs), very high frequency omnidirectional radio ranges (VORs), and the like), designated special use airspaces, obstacles, and the like overlying the terrain on the map. In one or more exemplary embodiments, the display system 110 accesses a synthetic vision terrain database 122 that includes positional (e.g., latitude and longitude), altitudinal, and other attribute information (e.g., terrain type information, such as water, land area, or the like) for the terrain, obstacles, and other features to support rendering a three-dimensional conformal synthetic perspective view of the terrain proximate the aircraft 102, as described in greater detail below.

In an exemplary embodiment, the processing system 108 may access a data storage element 124 (or database), which maintains information regarding airports and/or other potential landing locations (or destinations) for the aircraft 102. In this regard, the data storage element 124 maintains an association between a respective airport, its geographic location, runways (and their respective orientations and/or directions), instrument procedures (e.g., approaches, arrival routes, and the like), airspace restrictions, and/or other information or attributes associated with the respective airport (e.g., widths and/or weight limits of taxi paths, the type of surface of the runways or taxi path, and the like). Additionally, in some embodiments, the data storage element 124 also maintains status information for the runways and/or taxi paths at the airport indicating whether or not a particular runway and/or taxi path is currently operational along with directional information for the taxi paths (or portions thereof). The data storage element 124 may also be utilized to store or maintain other information pertaining to the airline or aircraft operator (e.g., airline or operator preferences, etc.) along with information pertaining to the pilot and/or co-pilot of the aircraft (e.g., pilot preferences, experience level, licensure or other qualifications, etc.).

Still referring to FIG. 1, in an exemplary embodiment, the processing system 108 is coupled to the navigation system 114, which is configured to provide real-time navigational data and/or information regarding operation of the aircraft 102. The navigation system 114 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 114, as will be appreciated in the art. The navigation system 114 is capable of obtaining and/or determining the instantaneous position of the aircraft 102, that is, the current (or instantaneous) location of the aircraft 102 (e.g., the current latitude and longitude) and the current (or instantaneous) altitude (or above ground level), airspeed, and ground speed for the aircraft 102. The navigation system 114 is also capable of obtaining or otherwise determining the heading of the aircraft 102 (i.e., the direction the aircraft is traveling in relative to some reference). Additionally, in an exemplary embodiment, the navigation system 114 includes inertial reference sensors capable of obtaining or otherwise determining the attitude or orientation (e.g., the pitch, roll, and yaw, heading) of the aircraft 102 relative to earth.

In an exemplary embodiment, the processing system 108 is also coupled to the FMS 116, which is coupled to the navigation system 114, the communications system 112, and one or more additional avionics systems 118 to support navigation, flight planning, and other aircraft control functions in a conventional manner, as well as to provide real-time data and/or information regarding the operational status of the aircraft 102 to the processing system 108. It should be noted that although FIG. 1 depicts a single avionics system 118, in practice, the aircraft system 100 and/or aircraft 102 will likely include numerous avionics systems for obtaining and/or providing real-time flight-related information that may be displayed on the display device 104 or otherwise provided to a user (e.g., a pilot, a co-pilot, or crew member). For example, practical embodiments of the aircraft system 100 and/or aircraft 102 will likely include one or more of the following avionics systems suitably configured to support operation of the aircraft 102: a weather system, an air traffic management system, a radar system, a traffic avoidance system, an autopilot system, an autothrottle system, a flight control system, hydraulics systems, pneumatics systems, environmental systems, electrical systems, engine systems, trim systems, lighting systems, crew alerting systems, electronic checklist systems, an electronic flight bag and/or another suitable avionics system.

In the illustrated embodiment, the onboard detection system(s) 120 generally represents the component(s) of the aircraft 102 that are coupled to the processing system 108 and/or the display system 110 to generate or otherwise provide information indicative of various objects or regions of interest within the vicinity of the aircraft 102 that are sensed, detected, or otherwise identified by a respective onboard detection system 120. For example, an onboard detection system 120 may be realized as a weather radar system or other weather sensing system that measures, senses, or otherwise detects meteorological conditions in the vicinity of the aircraft 102 and provides corresponding radar data (e.g., radar imaging data, range setting data, angle setting data, and/or the like) to one or more of the other onboard systems 108, 110, 114, 116, 118 for further processing and/or handling. For example, the processing system 108 and/or the display system 110 may generate or otherwise provide graphical representations of the meteorological conditions identified by the onboard detection system 120 on the display device 104 (e.g., on or overlying a lateral navigational map display). In another embodiment, an onboard detection system 120 may be realized as a collision avoidance system that measures, senses, or otherwise detects air traffic, obstacles, terrain and/or the like in the vicinity of the aircraft 102 and provides corresponding detection data to one or more of the other onboard systems 108, 110, 114, 116, 118.

In the illustrated embodiment, the processing system 108 is also coupled to the communications system 112, which is configured to support communications to and/or from the aircraft 102 via a communications network. For example, the communications system 112 may also include a data link system or another suitable radio communication system that supports communications between the aircraft 102 and one or more external monitoring systems, air traffic control, and/or another command center or ground location. In this regard, the communications system 112 may allow the aircraft 102 to receive information that would otherwise be unavailable to the pilot and/or co-pilot using the onboard systems 114, 116, 118, 120. For example, the communications system 112 may receive meteorological information from an external weather monitoring system, such as a Doppler radar monitoring system, a convective forecast system (e.g., a collaborative convective forecast product (CCFP) or national convective weather forecast (NCWF) system), an infrared satellite system, or the like, that is capable of providing information pertaining to the type, location and/or severity of precipitation, icing, turbulence, convection, cloud cover, wind shear, wind speed, lightning, freezing levels, cyclonic activity, thunderstorms, or the like along with other weather advisories, warnings, and/or watches. The meteorological information provided by an external weather monitoring system may also include forecast meteorological data that is generated based on historical trends and/or other weather observations, and may include forecasted meteorological data for geographical areas that are beyond the range of any weather detection systems 120 onboard the aircraft 102. In other embodiments, the processing system 108 may store or otherwise maintain historical meteorological data previously received from an external weather monitoring system, with the processing system 108 calculating or otherwise determining forecast meteorological for geographic areas of interest to the aircraft 102 based on the stored meteorological data and the current (or most recently received) meteorological data from the external weather monitoring system. In this regard, the meteorological information from the external weather monitoring system may be operationally used to obtain a "big picture" strategic view of the current weather phenomena and trends in its changes in intensity and/or movement with respect to prospective operation of the aircraft 102.

It should be understood that FIG. 1 is a simplified representation of the aircraft system 100 for purposes of explanation and ease of description, and FIG. 1 is not intended to limit the application or scope of the subject matter described herein in any way. It should be appreciated that although FIG. 1 shows the display device 104, the user input device 106, and the processing system 108 as being located onboard the aircraft 102 (e.g., in the cockpit), in practice, one or more of the display device 104, the user input device 106, and/or the processing system 108 may be located outside the aircraft 102 (e.g., on the ground as part of an air traffic control center or another command center) and communicatively coupled to the remaining elements of the aircraft system 100 (e.g., via a data link and/or communications system 112). In this regard, in some embodiments, the display device 104, the user input device 106, and/or the processing system 108 may be implemented as an electronic flight bag that is separate from the aircraft 102 but capable of being communicatively coupled to the other elements of the aircraft system 100 when onboard the aircraft 102. Similarly, in some embodiments, the data storage element 124 may be located outside the aircraft 102 and communicatively coupled to the processing system 108 via a data link and/or communications system 112. Furthermore, practical embodiments of the aircraft system 100 and/or aircraft 102 will include numerous other devices and components for providing additional functions and features, as will be appreciated in the art. In this regard, it will be appreciated that although FIG. 1 shows a single display device 104, in practice, additional display devices may be present onboard the aircraft 102. Additionally, it should be noted that in other embodiments, features and/or functionality of processing system 108 described herein can be implemented by or otherwise integrated with the features and/or functionality provided by the display system 110 or the FMS 116, or vice versa. In other words, some embodiments may integrate the processing system 108 with the display system 110 or the FMS 116; that is, the processing system 108 may be a component of the display system 110 and/or the FMS 116.

Methodology Implemented in the Aircraft System

Figure 2:
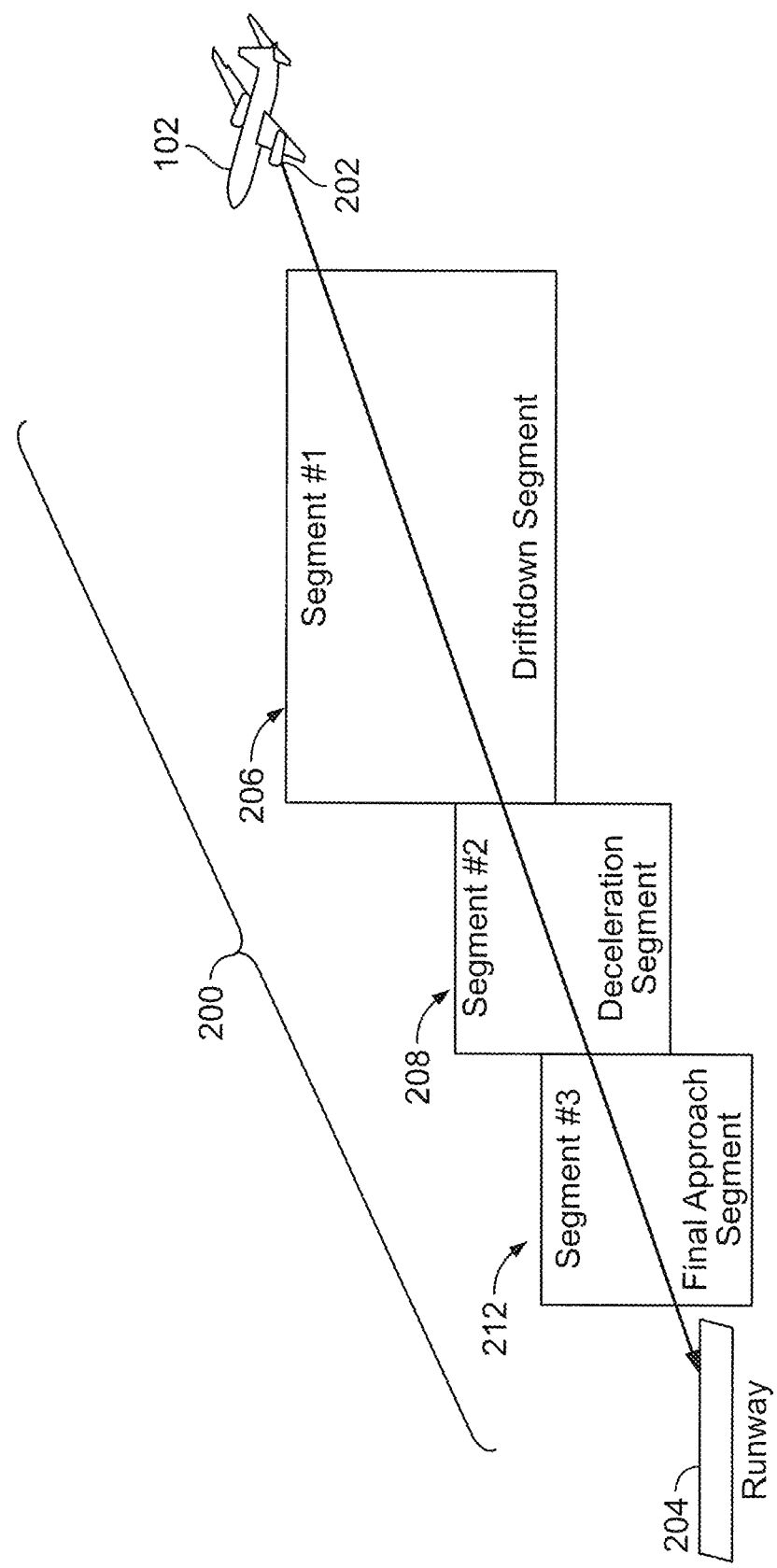
FIG. 2 depicts a flight path that is determined by the system of FIG. 1.

The methodology described herein and that is implemented in the described aircraft system 100 includes three distinct path segments that are individually determined by the aircraft system 100. The three distinct path segments are then connected together to form a complete vertical and lateral path in 3D space. Together, these segments provide a landing solution that will guide an aircraft from its present position to a runway for a controlled landing. The path 200 includes both lateral and vertical components that are specifically computed by, for example, the processing system 108 to maximize time aloft, manage energy conservation, and manage aircraft speed in a postulated all-engine-out scenario. The three segments are depicted in FIG. 2. Starting at the current aircraft position 202 and moving toward the runway 204, the aircraft 102 initially flies a first segment 206 (a "driftdown segment"), followed by a second segment 208 (a "deceleration segment"), and then a third segment 212 (a "final approach segment"). Each segment 202, 204, 206 is unique, and each is constructed by the aircraft system 100 to achieve specific aircraft performance.

The aircraft system 100 performs these path 200 determinations continuously and periodically in the background so, if needed by the pilot, they are immediately available to provide an instant landing solution to the pilot. These path computations are dependent upon the current aircraft state information, which may be provided from one or more of the navigation system 114, avionics system(s) 118, and detection system(s) 120; therefore, each path 200 is continuously and periodically determined to ensure that the landing solution is current and accurate.

Figure 3:
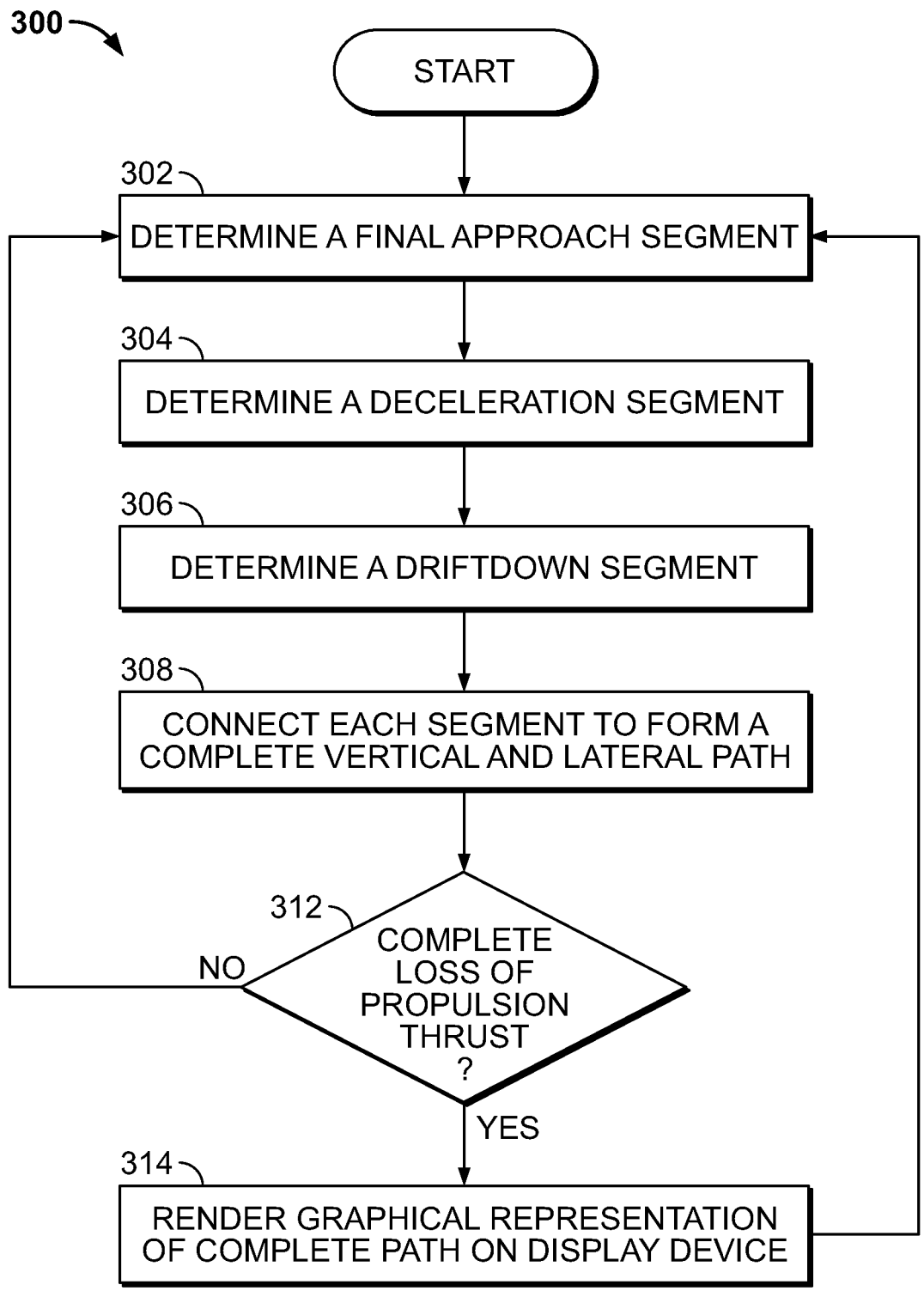
FIG. 3 depicts a process, in flowchart form, implemented in the system of FIG. 1 for determining the flight path in FIG. 2.

With reference now to FIG. 3, the general process 300 implemented in the aircraft system 100 is depicted and includes periodically (and repeatedly) determining the final approach segment 212 (task 302), determining the deceleration segment 208 (task 304), and determining the driftdown segment 206 (task 306). These segments 206, 208, 212 are then connected together to form the complete lateral and vertical path 200 from the current aircraft position 202 to a landing runway 204 (task 308). More specifically, the driftdown segment 206 is connected to the deceleration segment 208, and the deceleration segment 208 is connected to the final approach segment 212 to form the complete path 200. Thereafter, a determination is made as to whether a complete loss of engine thrust has occurred (task 312). If not, tasks 302-312 repeat. If so, a graphical representation of the complete path 200 from the current aircraft position 202 to the landing runway 204 is rendered on the display device 104 (task 314), and tasks 302-312 repeat. As may be appreciated, because these tasks are repeated, the graphical representation of the complete path is updated as the aircraft travels.

The various tasks performed in connection with the depicted process 300 may be implemented using hardware, firmware, software executed by processing circuitry, or any combination thereof. In practice, portions of the process 300 may be implemented in different elements of the aircraft system 100, such as the processing system 108, the display system 110, the communications system 112, the navigation system 114, the FMS 116, the onboard avionics systems 118 and/or the onboard detection systems 120. It should be appreciated that the depicted process 300 may include any number of additional or alternative tasks, the tasks need not be performed in the illustrated order and/or the tasks may be performed concurrently, and/or the process 300 may be incorporated into a more comprehensive procedure or process having additional functionality not described in detail herein. Each segment 206, 208, 212 and the computations performed by the aircraft system 100 for each segment 206, 208, 212 will now be described, beginning first with the final approach segment 212.

Final Approach Segment

The purpose of the final approach segment 212 is to align the aircraft 102 laterally with the runway 202 and to provide a vertical profile that maintains a controlled (preferably constant) landing speed until the aircraft 102 touches down on the landing runway. The energy source used to maintain the controlled airspeed is gravity. Therefore, it is a source of energy that can be relied upon under all conditions. The final approach segment 212 can loosely be considered the 'home safe' segment. If entry conditions from the previous segment (deceleration segment 208) are met, the likelihood of a controlled, successful landing is relatively high.

Figure 4:
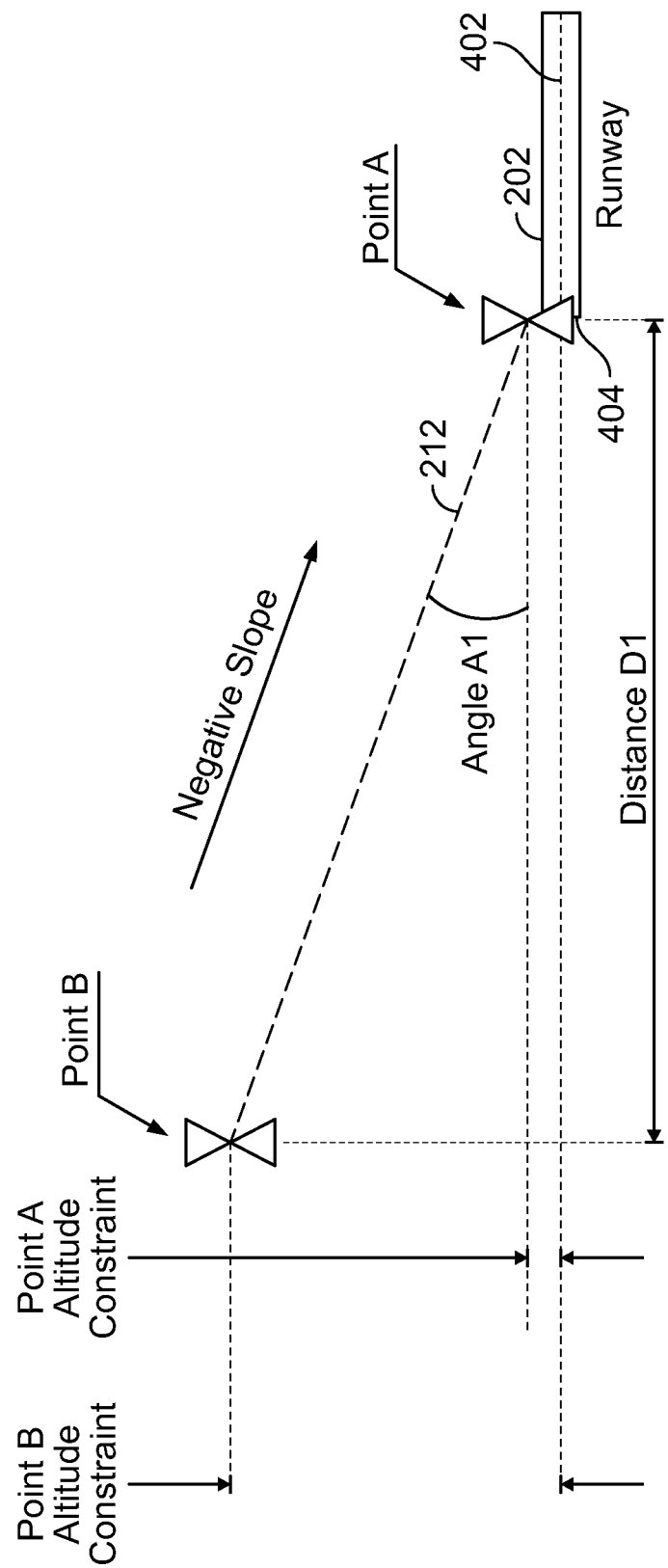
FIG. 4 depicts an example final approach segment.

Referring to FIG. 4, it may be seen that the final approach segment 212 is built starting at the runway 202 and extends up and away from the runway 202, following the runway centerline 402. When implemented, the aircraft 102 will control vertically and laterally to this segment 212, and the runway start end 404 is vertically constrained, at Point A, to an altitude value above the runway 202 (e.g., about 50 feet). The final approach segment 212 then slopes upward, for a horizontal distance (D1) and at an angle (A1), from Point A to Point B. It will be appreciated that Point A altitude, the Point B altitude, and the distance D1 may vary, and may be either predetermined values, or values that are selected in real-time as part of the final approach segment 212 determination process.

Regardless of the values of Point A altitude, Point B altitude, and distance D1, the angle A1 is calculated using various criteria. These include aircraft weight, altitude, temperature, wind speed and direction, aircraft drag based on an assumed flap setting, landing gear extension state and the additional drag induced by failed engines. The angle A1 is a significant parameter for determining speed, and is calculated as follows:

$$\text{Angle } A1 = \text{Arctan}([\text{Point } B \text{ altitude} - \text{point } A \text{ altitude}]/\text{distance } D1).$$

The angle A is calculated for the purpose of maintaining a constant airspeed for the duration of flight along the final approach segment 212. The downward slope of the final approach segment 212 will be greater than a standard approach. Standard approach segments rely on thrust to maintain a target airspeed. Here, however, the slope accommodates a no thrust condition, whereas typical approach segments rely on thrust to maintain a target airspeed.

Various assumptions are implemented in the aircraft system 100 as to the aircraft state upon entering the final approach segment 212. These include that the aircraft 102 will enter this segment 212 after completing the previous segment (e.g., the deceleration segment 208), that the aircraft 102 enters this segment 212 within a prescribed airspeed range, that the aircraft 102 enters this segment 212 actively controlling to the determined vertical path, and that the aircraft 102 enters this segment 212 at a predetermined flap setting, which will remain constant while on this segment 212, though the setting may vary between airframes. The assumptions additionally include that the aircraft 102 enters this segment 212 in a prescribed landing gear setting. Specifically, upon entering the final approach segment 212, the landing gear is not extended, but that the pilot can extend the landing gear after sequencing onto this segment 212. It should be noted, however, that in some embodiments deploying the landing gear before this segment 212 may be the pilot's decision and this segment 212 may not be modified to support an early landing gear extension; in other embodiments, however, the segment 212 may be modified.

Deceleration Segment

Figure 5:
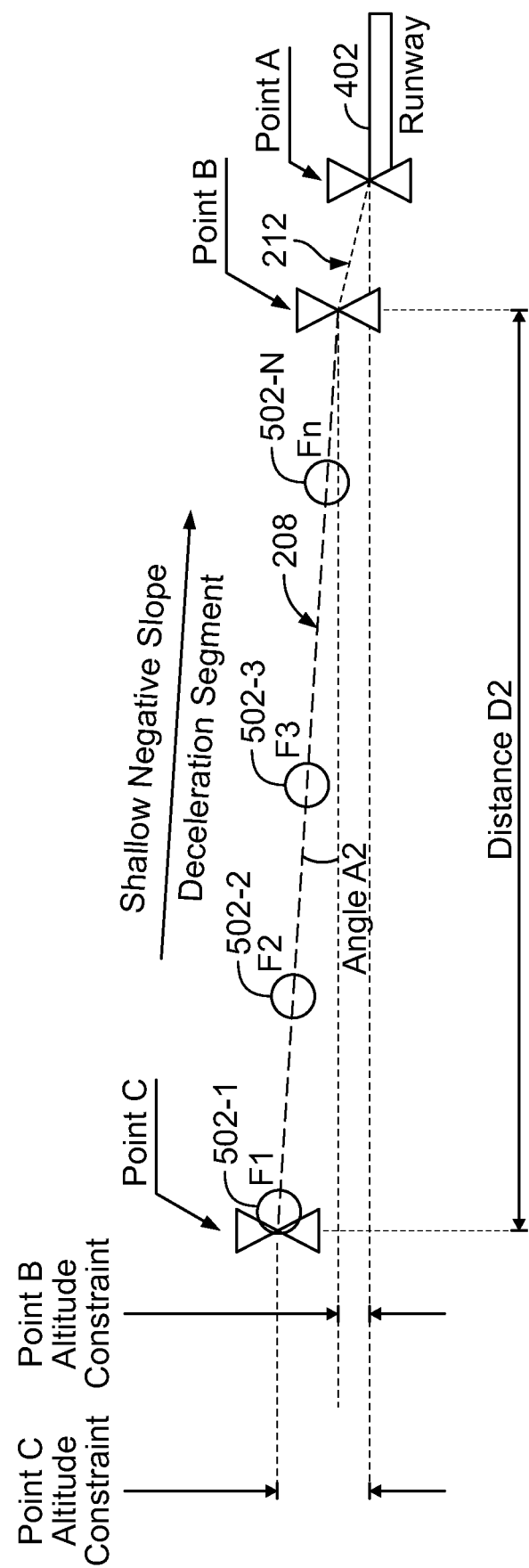
FIG. 5 depicts an example deceleration segment.

The deceleration segment 208 is the path that the aircraft 102 will traverse, just prior to entering the final approach segment 212, to reduce aircraft speed to the controlled landing speed. The aircraft 102 enters the deceleration segment 208 from the downdrift segment 206. As such, it will be travelling at an airspeed that is higher than the controlled landing speed. Thus, the purpose of the deceleration segment 208 is twofold—it serves to slow the speed of the aircraft 102 and, as the aircraft slows, allows for the extension of flaps. As depicted in FIG. 5, the deceleration segment 208 is built starting from the entry point of the final approach segment 212 (Point B), and extending out to Point C, at a distance D2 and at an angle A2. The deceleration segment 208 may or may not align laterally with the final approach segment 212. Certain conditions may require a directional change when transitioning from the deceleration segment 208 to the final approach segment 212. For example, in an engine failure condition close to the ground, the aircraft system 100 may determine that a directional change reduces the length of the path to the runway and provides the best energy conservation.

The aircraft 102 will be controlled vertically and laterally to the deceleration segment 208 and various assumptions are implemented in the aircraft system 100 upon entering into the deceleration segment 208. First, the aircraft 102 is being controlled, either automatically or manually, to the vertical path (i.e., minimal vertical track error) upon entry into the deceleration segment 208. Second, the aircraft 102 airspeed is at or above the Max L/D airspeed (airspeed used in the driftdown segment 206).

The angle A2 and distance D2 are calculated by the aircraft system 100 to allow for a desired speed reduction from the entry point (Point C) to the exit point (Point B). The desired speed reduction is accomplished by constructing a vertical segment that is sufficiently shallow to reduce the consumption of potential energy (altitude) and result in a reduction of airspeed. The desired speed reduction is additionally accomplished by the extension of flaps. The additional drag of the flaps is factored into the determination of distance D2 and angle A2, and the aircraft system 100 considers the drag of each flap setting from the time of deployment through the end of the deceleration segment 208. The aircraft system 100 builds this segment 208 based on the assumption that that the pilot will deploy flaps at the determined points.

The aircraft system 100 will command the display device 104 to provide visual flap extension cues 502 (502-1, 502-2, 502-3, . . . 502-N) to the pilot. These cues 502 will start with the minimum flap setting and continue to the desired maximum flap setting to be used for landing. It should be noted that the maximum flap setting may not be commanded under certain conditions. This may include low energy conditions where additional flap drag may excessively reduce the aircraft energy condition.

The aircraft system 100 considers aircraft weight, altitude, temperature, current airspeed, current wind speed and direction, and, at least in some embodiments, the predicted wind speed and direction in the calculation of angle A2, distance D2, and placement of the flap extension cues 502. The aircraft system 100 also considers available energy when calculating the deceleration segment 208. The aircraft system 100 continuously evaluates and modifies the distance D2, angle A2, and flap extension cues 502 before entering onto the deceleration segment 208. In a condition where energy is lower than desired before sequencing onto the deceleration segment 208, the processor 2202 may shorten distance D2 or increase angle A2, as necessary, to maintain speed on the deceleration segment 208. The aircraft system 100 will also continuously evaluate the display of flap deployment cues 502 when the aircraft 102 is actively flying on the deceleration segment 208. The aircraft system 100 will prioritize deceleration segment 208 exit speed as it calculates flap extension cues. If conditions change during the deceleration segment 208 that slow the aircraft below the deceleration speed schedule determined by the aircraft system 100, the aircraft system 100 may delay flap deployment to meet or exceed the minimum segment exit airspeed. The aircraft system 100, however, will not recalculate angle A2 or distance D2 while actively flying the deceleration segment 208.

Figure 6:
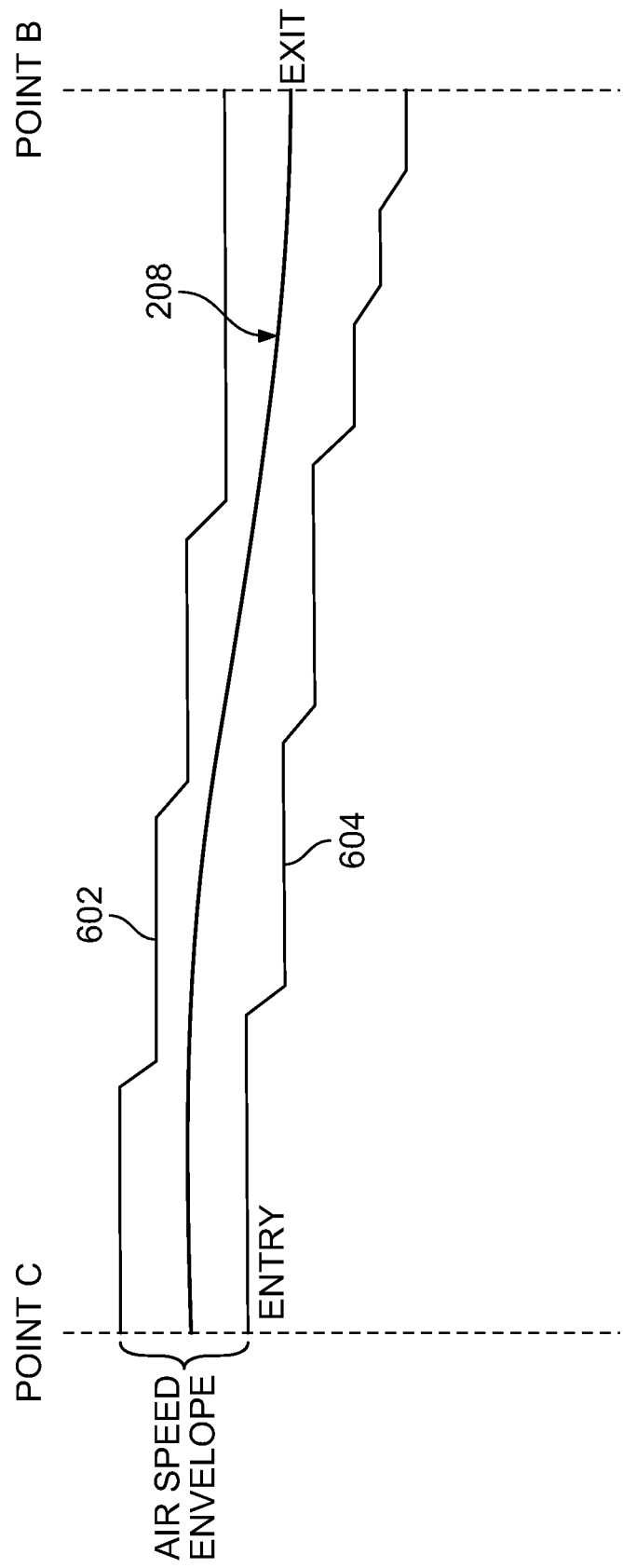
FIG. 6 depicts an example flap extension envelope for use during the deceleration segment.

The aircraft system 100 will recalculate and command the redisplay of the flap extension cues 502 based on various factors. One factor is current conditions, such as wind and airspeed. The goal is to continuously manage flap drag to achieve a target airspeed upon exit of the deceleration segment 208. The aircraft system 100 will always prioritize a higher airspeed over a lower airspeed in order to ensure that the airspeed, upon exiting the deceleration segment 208, does not drop below a minimum specified airspeed. Another factor relates to a flap extension schedule. For example, as depicted in FIG. 6, flaps will be commanded in a manner that does not exceed maximum airspeed specification of a flap setting 602, and that maintains a minimum airspeed margin above a minimum airspeed 604.

Driftdown Segment

The driftdown segment 206 is the path that the aircraft 102 will traverse upon initiation of a complete loss of engine thrust and just prior to entering the deceleration segment 208. The purpose of the driftdown segment 206 is to reduce aircraft potential energy to a predetermined magnitude upon entry to the deceleration segment 208. The deceleration segment 206 comprises a lateral and vertical path from the aircraft position at the time of the complete loss of engine thrust to the entry of the deceleration segment 208. The driftdown segment 206 is built laterally from the entry point of the deceleration segment 206 to the current lateral position of the aircraft 102. The primary goal of the driftdown segment 206 is to maximize the time aloft, or endurance, of the aircraft 102 in a complete loss of thrust condition.

The process for determining the driftdown segment 106 is iterative, and it begins by determining the vertical difference between the current aircraft altitude and the deceleration segment entry point (i.e., Point C). As may be appreciated, the vertical and lateral components of the driftdown segment 206 are interrelated, and the aircraft system 100 assumes that this segment 104 will be flown at the maximum lift-to-drag ratio airspeed (Max L/D speed), which is calculated by the aircraft system 100. If a direct line lateral path from the current aircraft position to the deceleration segment 208 provides sufficient potential energy margin for the aircraft to fly to the deceleration segment 208, the aircraft system 100 may consider this as a valid solution for pilot selection. If, however, the potential energy margin is above a predetermined threshold percentage, the aircraft system 100 will lengthen the lateral path portion of the driftdown segment 206 to increase the distance to the deceleration segment 208, and therefore provide more time aloft. The aircraft system 100 preferably constructs the lateral path to meet a target vertical margin range. Indeed, the aircraft system 100 will iterate the length of the lateral path until the path is built to the nose of the aircraft with sufficient potential energy margin. For example, the aircraft system 100 may iterate the length of the path until there is about a 1000-foot (305 meter) difference between the path height and aircraft height. In this case, the aircraft height is always above the vertical portion of the path.

The vertical portion of the driftdown segment 206 has a negative slope that is adjusted to hold the Max L/D speed. The slope is dependent upon several factors such as, for example, failed engine drag, current wind speed and direction, predicted wind speed and direction, aircraft weight, aircraft altitude, temperature, etc., all of which are provided by the one or more of the avionics systems(s) 118 and detection system(s) 120. As may be appreciated, the determined slope may change throughout the driftdown segment 206.

It will be appreciated that the potential energy margin that is considered to be "sufficient", and thus the predetermined threshold percentage, may vary from aircraft-to-aircraft, flight-to-flight, and situation-to-situation. Various factors, such as aircraft speed, aircraft weight, wind speed and direction, drag, just to name a few, will factor into making these determinations. This methodology is chosen to provide the flight crew with additional energy above the minimum required energy to return to the airport. The excess energy can be used as a buffer against changing winds or turbulence that may affect the aircraft. The driftdown segment 206 will preferably be flown in a speed on elevator control mode. This mode pitches the aircraft to maintain the speed target, which is the best lift/drag ratio airspeed.

Figure 7:
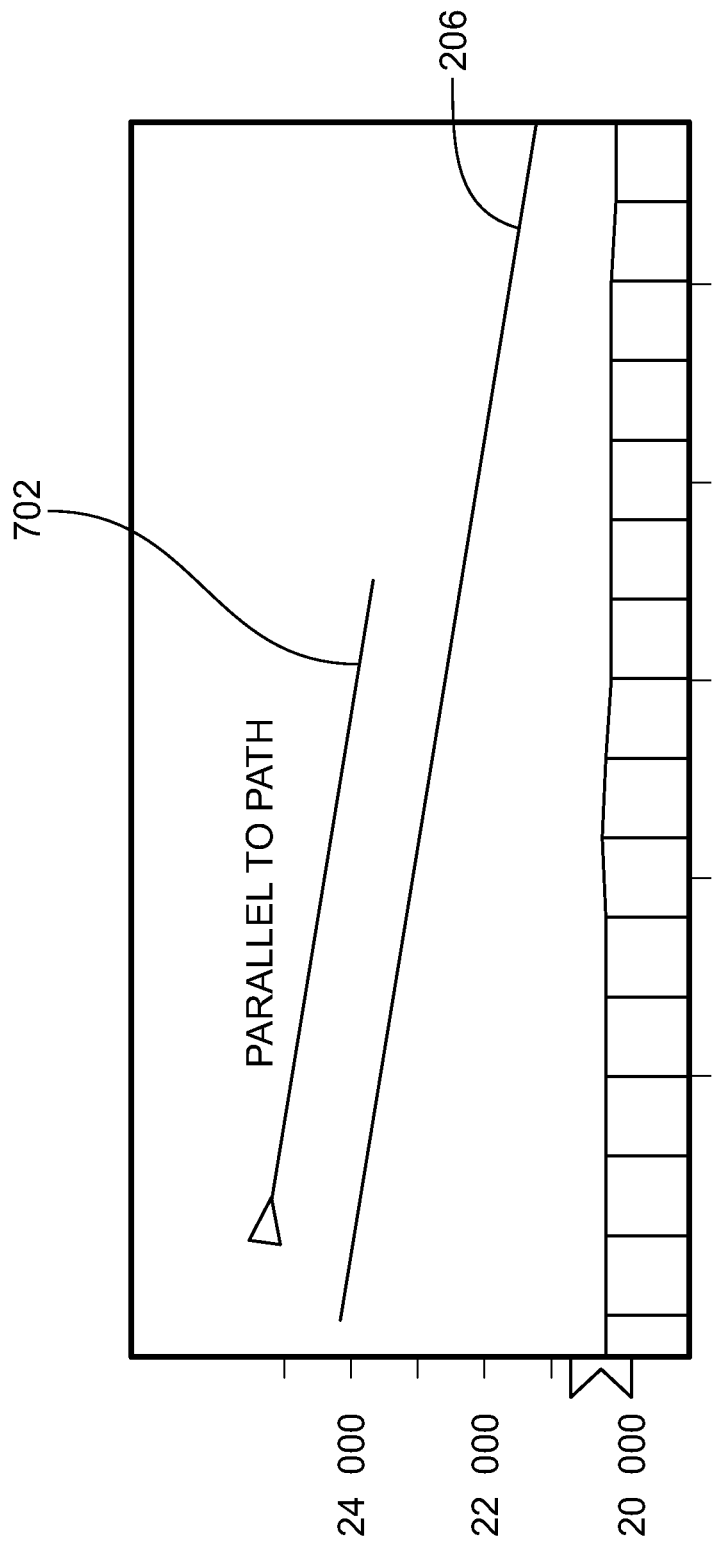
FIG. 7 depicts an example driftdown segment above a computed vertical path.

As depicted in FIG. 7, the driftdown segment 206 is constructed in a manner that it will be flown above the computed vertical path. The altitude 702 above the vertical path is the vertical energy margin, and it is considered ideal if this margin remains at a constant value throughout the duration of the driftdown segment 206. If the actual aircraft vertical profile matches that of the computed vertical profile 206, it indicates that energy is being reduced at the rate calculated by the aircraft system 100. In the absence of shifting wind direction and speed, this rate will provide a safe return to the runway.

The aircraft system 100 also considers kinetic energy in the calculation of the driftdown segment 106. If current aircraft airspeed is above the Max L/D speed, this excess kinetic energy can be used to extend the time aloft. The aircraft system 100 can use this speed difference to extend the length of the lateral path, therefore extending the flight time aloft.

Upon activation of the process 300, the aircraft system 100 will immediately target the Max L/D speed. This will result in a pitch-up action as the aircraft slows to the slower airspeed target. This pitch-up action allows the aircraft 102 to remain above the minimum path for a longer period of time.

The driftdown segment 206 is additionally constructed in a way that it will not exceed the spoiler authority of the aircraft 102. Indeed, slope of the driftdown segment 206 will not be close to the spoiler authority (although, as discussed below, a speed brake authority limit line is rendered). This means that the energy margin calculated by the aircraft system 100 can be reduced to zero (vertical path intercept) through the use of speed brakes. The final portion of the driftdown segment 206 is intended for this purpose. The process 300 assumes that the deceleration segment 208 will be entered controlling to the vertical path; therefore, all excess vertical energy margin near the end of the driftdown segment 206 should be dissipated. Preferably, the driftdown segment 206 is implemented to maintain energy margin as long as possible until the end of the segment 206. The use of speed brakes in this situation will be a pilot decision. Ideally, the aircraft 102 will be controlled (either automatically or manually) to intercept the vertical path 702 as close as possible to the entry point (Point C) of the deceleration segment 208. This will reduce the time on the vertical path 702 where the energy margin is zero.

The driftdown segment 206 determination includes the impact of several effects. For example, the driftdown segment 206 determination considers the effects of bank angle. As is generally known, higher bank angles consume more energy, but also require less lateral distance to execute a directional change. The driftdown segment 206 determination also considers the effects of speed targeting. In most situations, the most significant goal is maximizing time aloft. This equates to flying at the Max L/D speed. In conditions where aircraft energy is near the minimum of that required for landing, the aircraft system 100 may opt to fly at a higher airspeed. This speed, known as long range cruise, can extend the distance flown by the aircraft 102, but at the expense of time aloft.

The driftdown segment 206 determination is adaptable to multiple flight conditions. In general, these flight conditions include minimal energy, moderate energy, and excess energy conditions. The minimal energy condition is defined as the aircraft 102 being in a low-altitude operational phase, such as during takeoff, during arrival, or during approach. In the minimal energy condition, aircraft potential energy, stored as altitude, is relatively low, and aircraft kinetic energy, in the form of airspeed, is also relatively low. The moderate energy condition is defined as the aircraft being operated in the climb-out or arrival flight phase. In this condition, the aircraft has considerably more potential energy than the minimal energy state and, depending on the situation, may also have more kinetic energy. The high energy condition is defined as the aircraft being operated in the cruise flight phase, where altitude and speed are both relatively high, and therefore aircraft potential and kinetic energy are both relatively high.

Each of the above-mentioned energy conditions may result in different strategies for constructing the driftdown segment 206. For example, in the minimal energy condition, the final approach segment 212 and the deceleration segment 208 may be modified (e.g., shortened) to adapt to the energy remaining in the aircraft 102. In the minimal energy condition, the driftdown segment 206 will generally minimize the lateral distance to enable more vertical margin. As already noted, high bank turn requirements use proportionally more energy to fly, and this is taken into account by the aircraft system 100.

Minimal Energy Condition

The minimal energy condition may also, in some instances, result in the deceleration segment 208 being on a different track than the final approach segment 212, which would result in a turn at the transition from the deceleration segment 208 to the final approach segment 212. This may limit the total lateral distance to the runway 204, thereby conserving energy. One postulated example of this scenario would be the highly unlikely case of a complete loss of engine thrust soon after takeoff. In such a scenario, the most probable airport to land at will be the departure airport, which may require a 180-degree directional change. The aircraft system 100 would compute a return path 200 that provides sufficient energy to perform a precision landing, along with sufficient energy margin to accommodate unforeseen conditions. In addition to computing a flyable path, the aircraft system 100 will also consider maximum spoiler authority.

Figure 8:
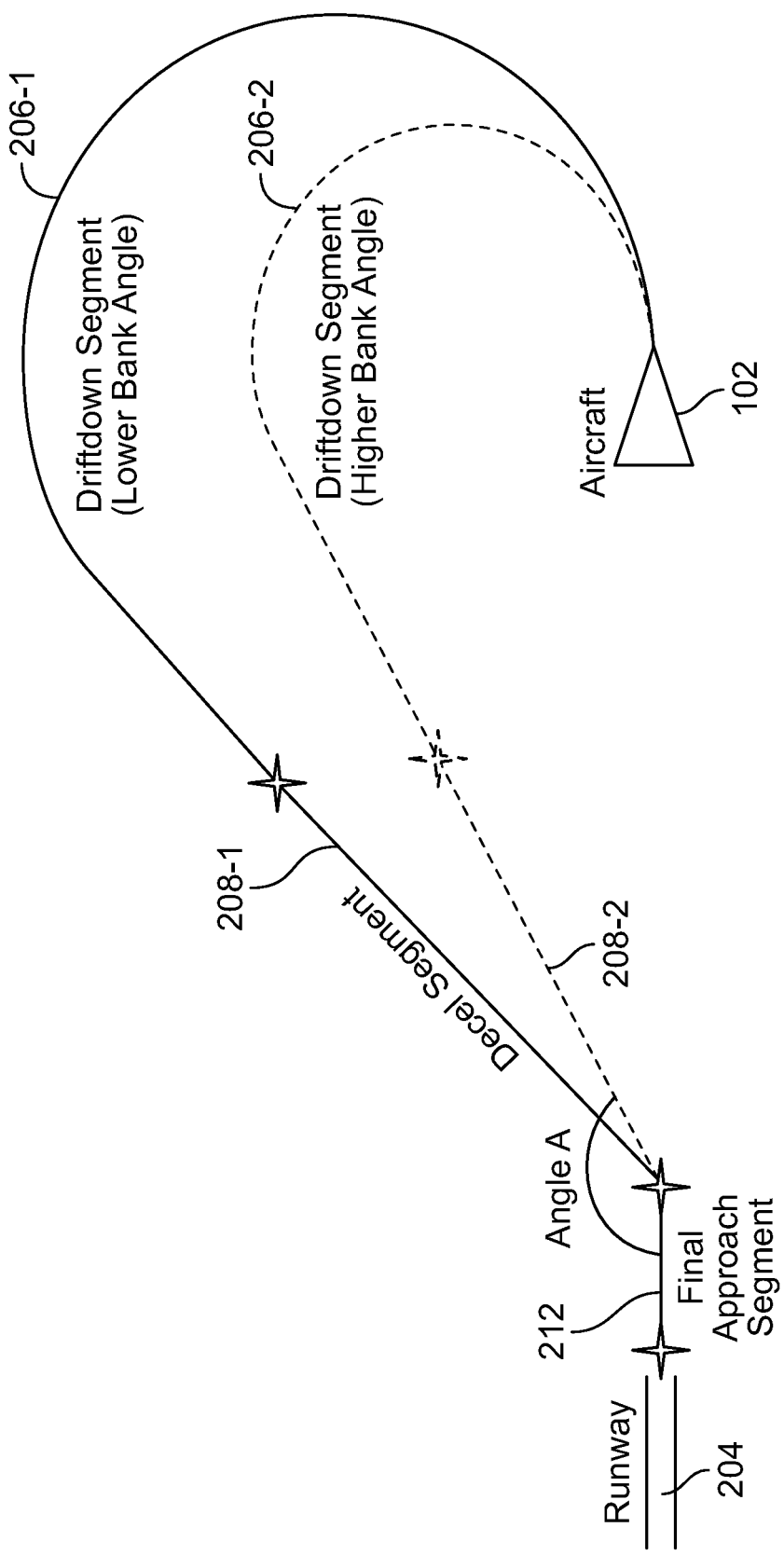
FIG. 8 depicts an example of a computed driftdown segment lateral path.
Figure 9:
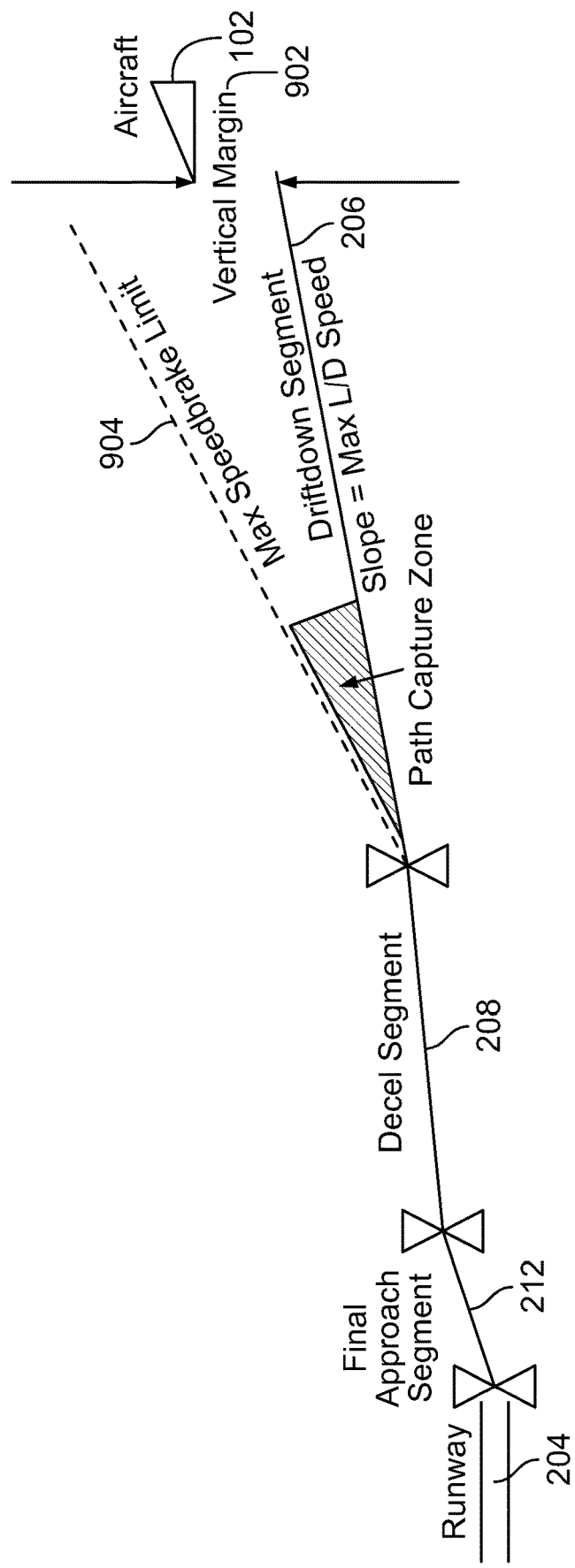
FIG. 9 depicts an example of a computed driftdown segment vertical path.

One example of the scenario in which a total loss of engine thrust occurs soon after takeoff is depicted in FIGS. 8 and 9. In particular, FIG. 8 depicts the lateral path computed by the aircraft system 100 for two different bank angles being implemented as part of the driftdown segment 206—one for a relatively low bank angle 206-1 and one for a relatively high bank angle 206-2. The aircraft system 100 compares the effects of increased drag of a high bank angle 206-2 to the longer lateral distance of a low bank angle 206-1, and preferably selects the most energy conserving solution. Since lateral space is typically limited in the minimal energy condition, the aircraft system 100 will compute a turn back toward the airport. Based upon the construction of bank angle arc, the aircraft system 100 fits the deceleration segment 208 to the arc and transitions the deceleration segment 208 into the final approach segment 212 at an angle A. This is a minimal energy condition where there is very little excess energy available.

As depicted in FIG. 9, the aircraft system 100 also calculates the slope necessary to maintain Max L/D speed and, based thereon, builds the vertical portion of the return path. The aircraft system 100 also calculates the vertical margin 902 between the altitude of the aircraft 102 and the altitude of the vertical portion of driftdown segment 206 at the current aircraft position. In addition, the aircraft system 100 considers the current aircraft airspeed and compares this to the Max L/D speed. If the current airspeed is higher, the aircraft system 100 considers this as excess kinetic energy.

In the minimal energy condition, the aircraft system 100 preferably constructs the return path 200 with the shortest final approach segment 212 possible to allow more space for the turnback. The deceleration segment 208 is constructed laterally as short as possible while the vertical portion of the deceleration segment 208 is sufficient to slow the aircraft from the target entry speed to the target exit speed. The deceleration segment 208 is angled to accommodate the minimal turn distance available for return to the runway. The driftdown segment 206 is then built laterally from the deceleration segment 208 to the current aircraft position 202. If sufficient energy exists to return to the runway 202 with sufficient energy margin, and within the maximum speedbrake limit 904 (see FIG. 9), the aircraft system 100 makes this solution available to the pilot for selection.

Moderate Energy Condition

Figure 10:
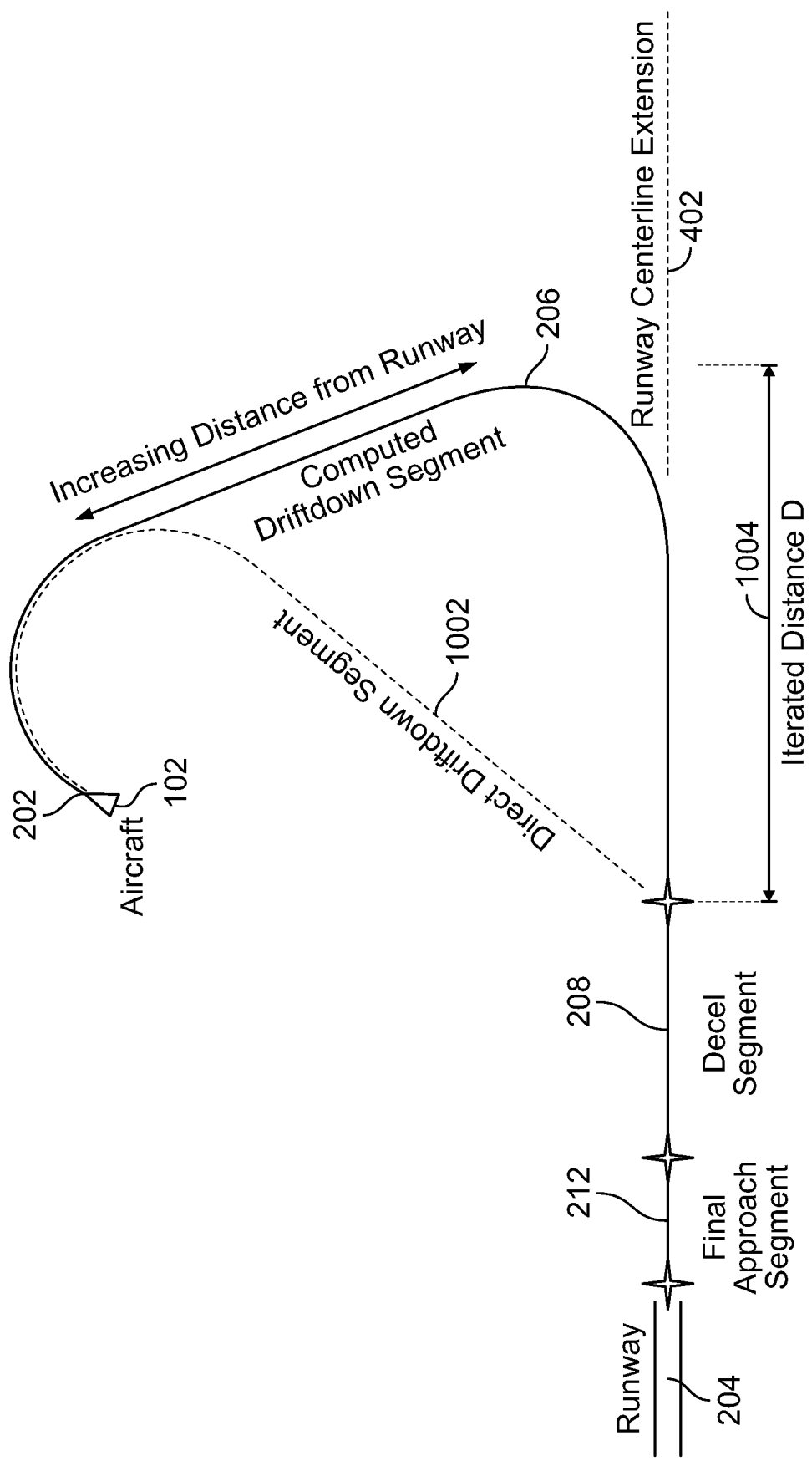
FIG. 10 depicts another example of a computed driftdown segment lateral path.
Figure 11:
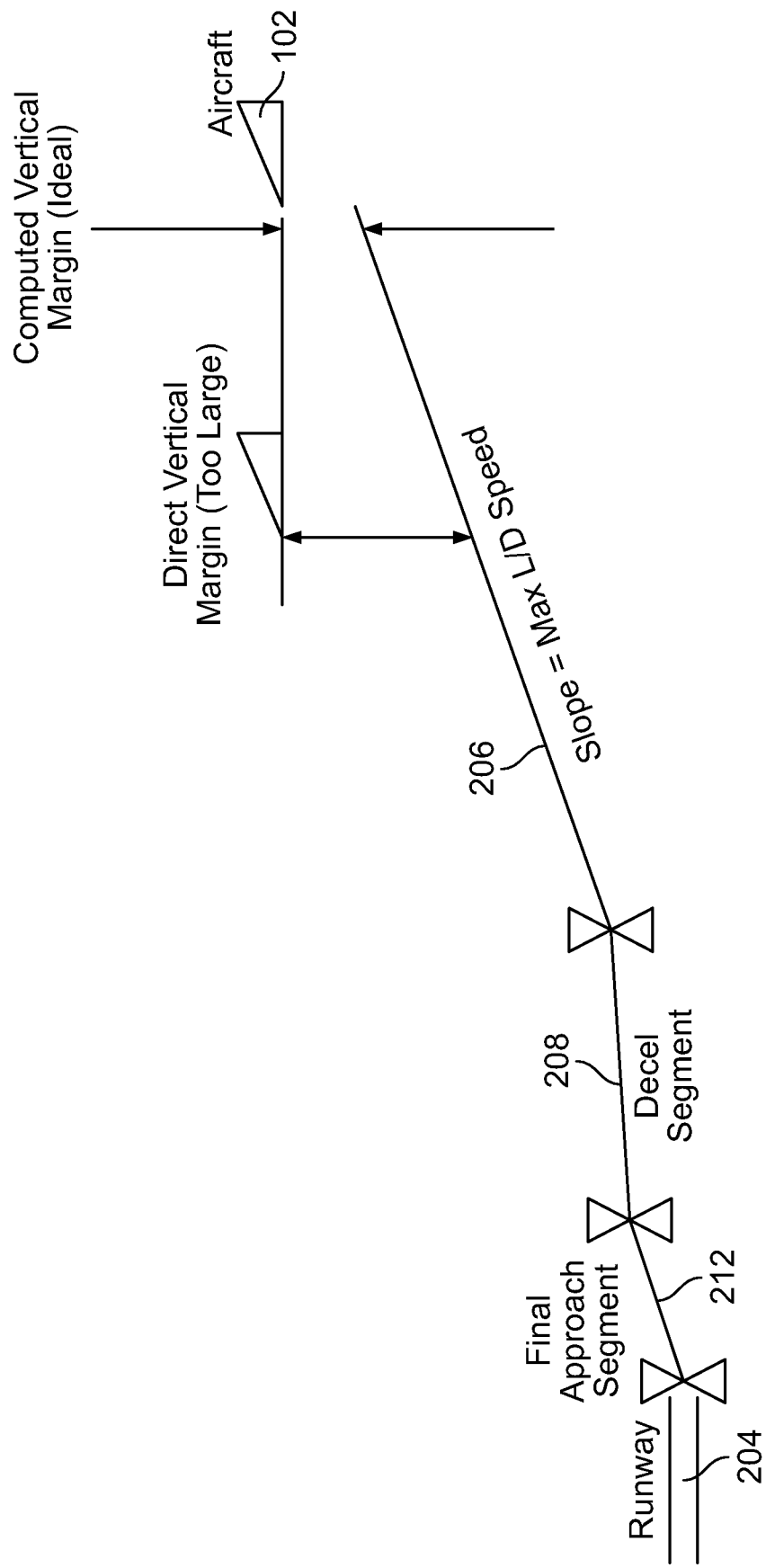
FIG. 11 depicts another example of a computed driftdown segment vertical path.

Referring now to FIGS. 10 and 11, an example of the lateral and vertical components of the return path 200 in the moderate energy condition are depicted. In the moderate energy condition, the aircraft system 100 will typically set the length of the final approach segment 212 and build the deceleration segment 208 on the same track as the final approach segment 112. This geometry tends to simplify the approach for the pilot, since it is straight into the runway 204. The driftdown segment 206 also continues on this track, extending out from the runway 204 and aligned with the runway centerline. As FIG. 10 depicts, one feature of the driftdown segment 206 in the moderate energy condition is the possibility of building a lateral path that temporarily increases the distance to the runway 202. As shown most clearly in FIG. 11, a direct lateral path from the current aircraft position 202 to the deceleration segment 108 can result in a relatively large energy margin above the path. Thus, referring again to FIG. 10, from the current aircraft position 202, the aircraft system 100 iterates a solution that involves the direct path 1002 from the current aircraft position 202 to a point located along the runway centerline 402. The distance (D) 1004 from the end of the driftdown segment 206 (i.e., the beginning of deceleration segment 208) back along the runway centerline 402 is iterated by the aircraft system 100 to provide the ideal vertical path margin at the current aircraft position 202. The path is then constructed as a direct path from the current aircraft position 202 to this point along the runway centerline 402.

Figure 12:
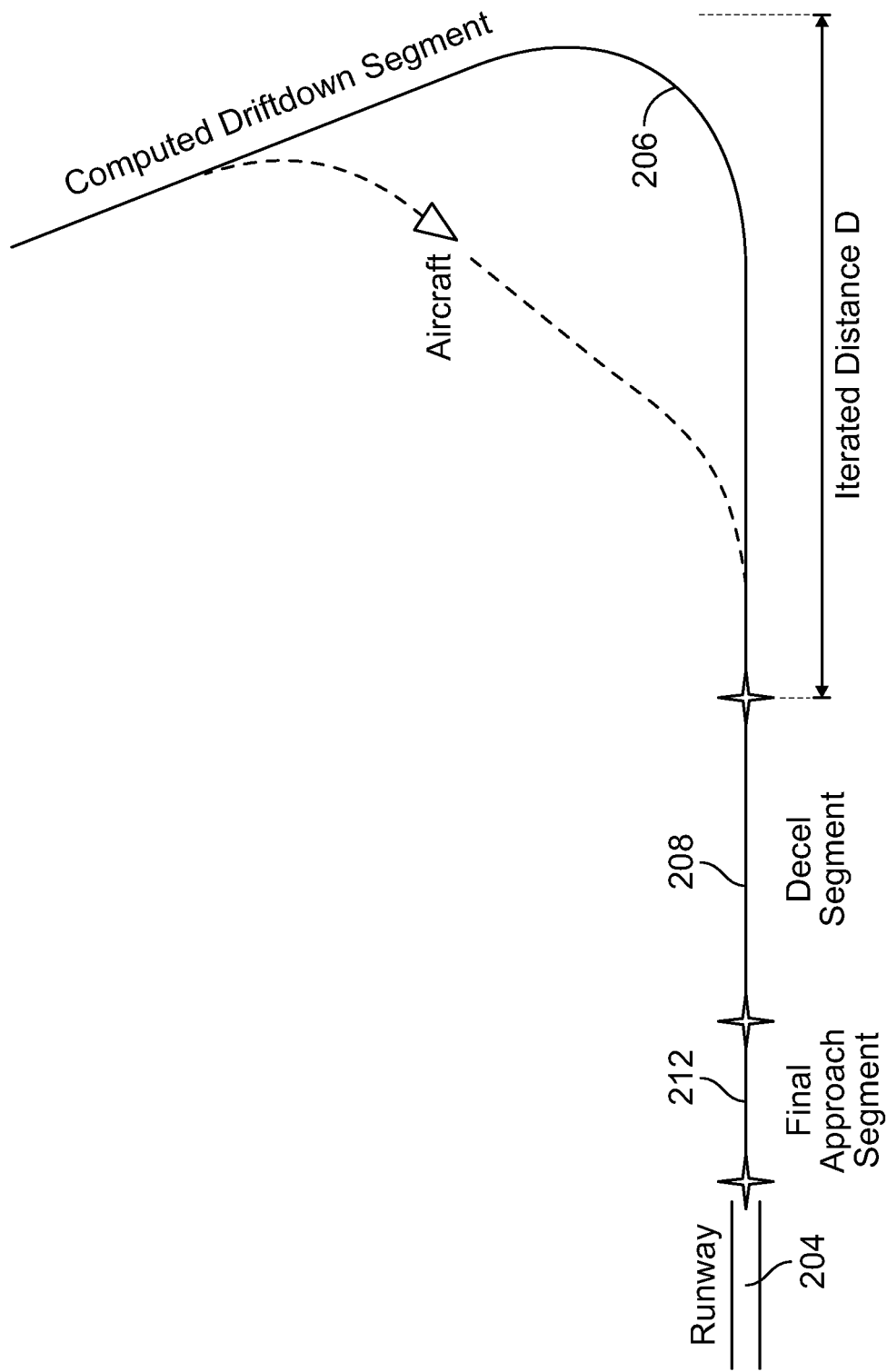
FIG. 12 depicts an example of a driftdown segment energy recovery maneuver.

While flying the path 200 in the moderate energy condition, the pilot has the authority to manually change the aircraft track toward the runway centerline, and closer to the runway 202. This reduces the lateral distance to be travelled and, as a result, will increase the vertical energy margin. This option is depicted in FIG. 12.

Excess Energy Condition

In cases where the aircraft 102 is in the excess energy condition at the time of complete loss of engine thrust, the aircraft system 100 can implement numerous options in determining the driftdown segment 206. These options include implementing a holding pattern, an S-turn pattern, and an S-turn intercept pattern.

Figure 13:
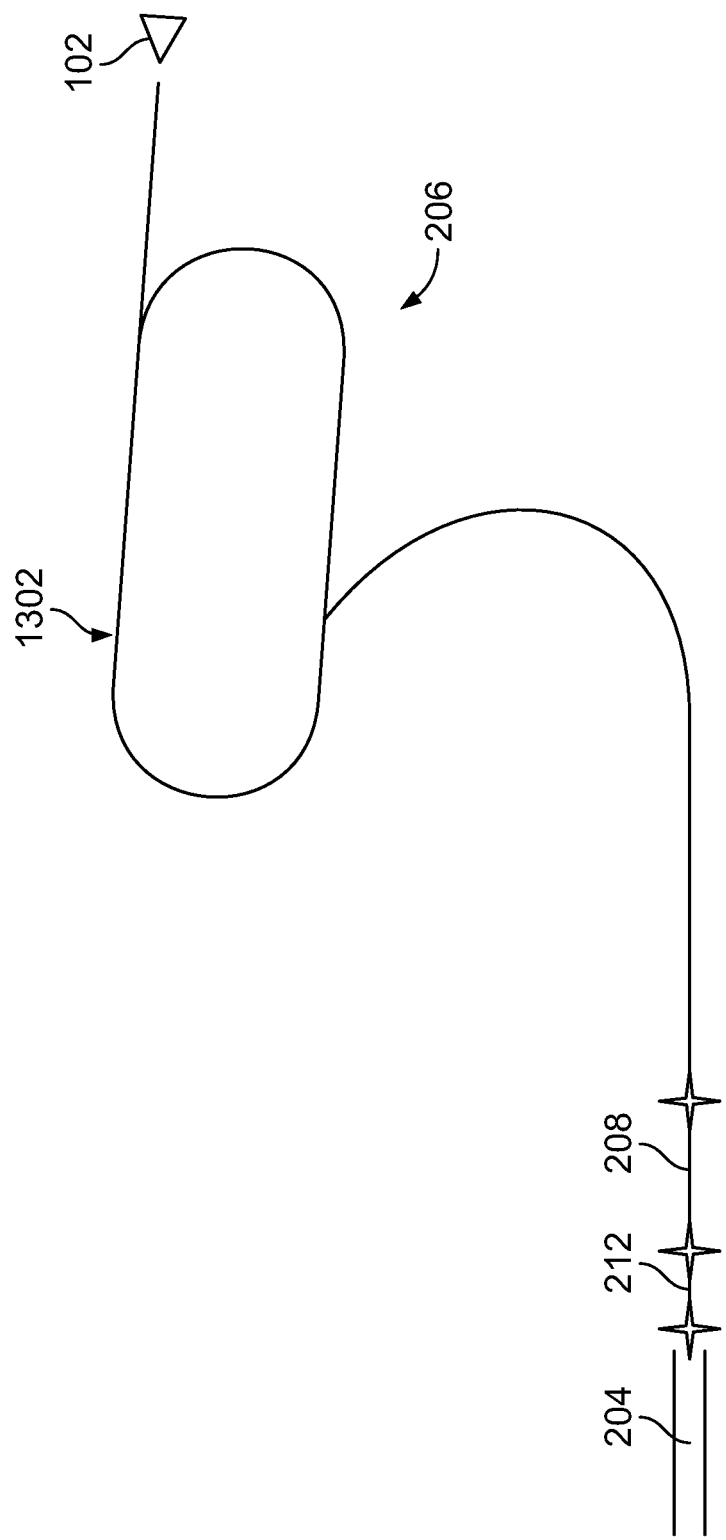
FIG. 13 depicts an example of a driftdown segment holding pattern option.

With the holding pattern option, an example which is depicted in FIG. 13, the final approach segment 212 and the deceleration segment 208 are determined as normal. However, the driftdown segment 206 includes a holding pattern 1302, which is used to circle down to an altitude and position suitable for entry either into the deceleration segment 208 or into a non-depicted S-turn pattern (described momentarily). This option has the advantage of keeping the return path 200 compact and possibly closer to the runway 204. The location of the holding pattern 1302 can be adjusted for terrain.

Figure 14:
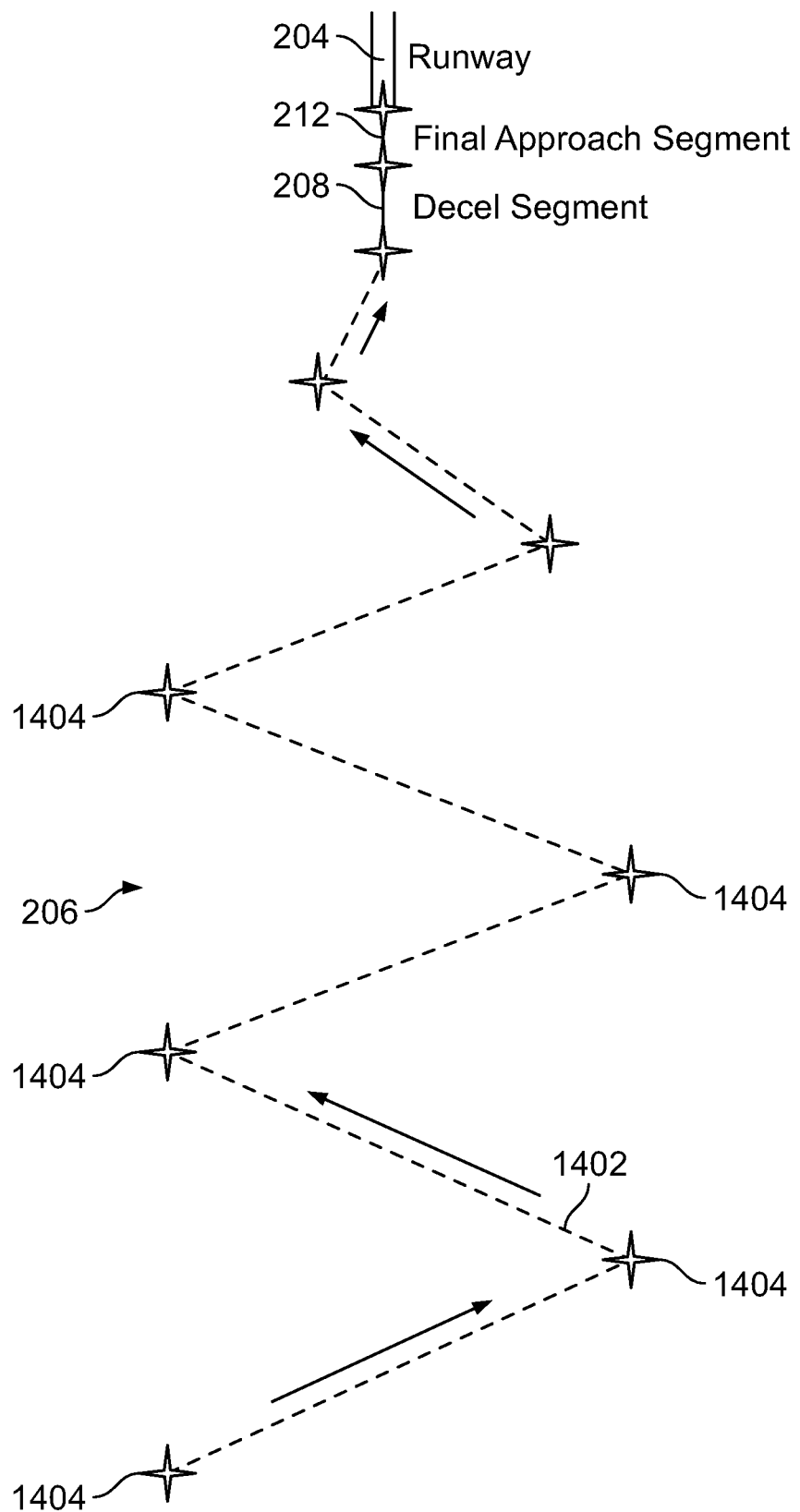
FIG. 14 depicts an example of a driftdown segment S-turn pattern option.

With the S-turn pattern option, an example of which is depicted in FIG. 14, the lateral portion of the driftdown segment 206 is implemented in a side-to-side manner, terminating at the entry point of the deceleration segment 208. This option provides the advantage of the runway 202 generally remaining in view during the maneuver. In addition, flight through the S-turn pattern 1402 progressively moves closer to the runway 202. Entry into the S-turn pattern 1402 is iterated by the aircraft system 100 by performing a direct leg from the current aircraft position to a point on the S-turn pattern 1402, then calculating the vertical energy margin for that particular path. If the first iteration results in an energy margin that is too high, the aircraft system 100 then picks a point farther back on the S-turn pattern 1402. This increases the lateral distance and reduces the vertical margin. The aircraft system 100 iterates until the ideal vertical margin is achieved. The aircraft system 100 may also iterate between the waypoints 1404. This provides the maximum time aloft with sufficient vertical margin to accommodate unexpected changes.

Figure 15:
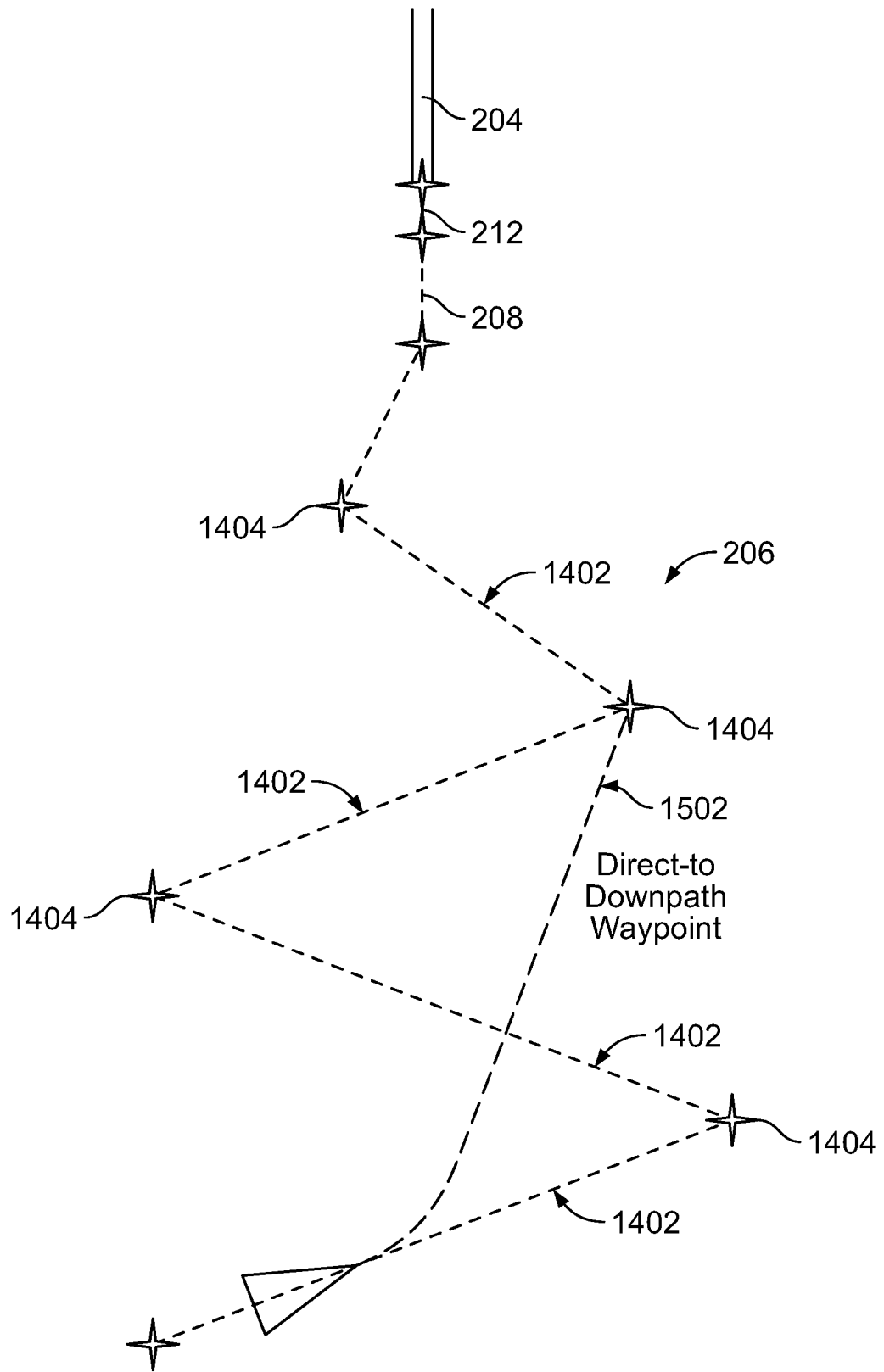
FIG. 15 depicts an example of an energy gain maneuver in an S-turn option.

The S-turn pattern option is also ideal for energy margin recovery. For example, if energy margin is running low, the pilot can either manually bypass some turns, or perform a direct-to path modification 1502 as shown in FIG. 15. Either action will increase energy margin by reducing lateral distance.

Figure 16:
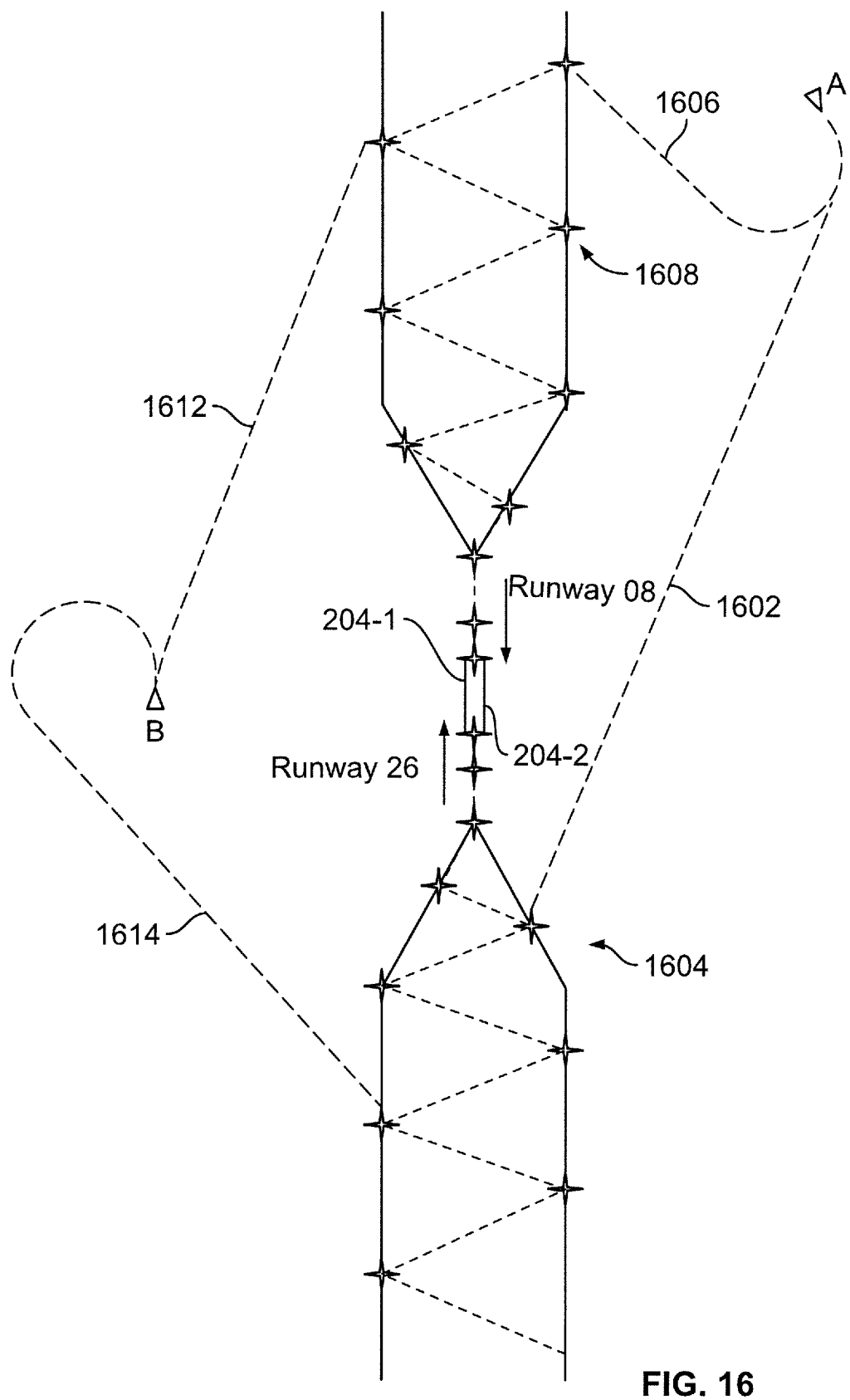
FIG. 16 depicts examples of drifdown segment multiple S-turn intercept options.

An example of the S-turn intercept option is depicted in FIG. 16. More specifically, FIG. 16 depicts multiple S-turn intercept options. Two aircraft are shown, aircraft A and aircraft B, and two S-turn intercept options are possible for each aircraft. Aircraft A is shown with 2 distinct options, a long straight leg 1602 for a short S-turn pattern 1604 onto a first runway 204-1, or a quick turn 1606 for a longer S-turn pattern 1608 into a second runway 204-2. Aircraft B is also shown with 2 distinct options, a long straight leg 1612 for a relatively longer S-turn pattern 1608 onto the second runway 204-2, or a turn and straight leg option 1614 for a relatively long S-turn pattern 1604 into the first runway 204-1.

Figure 17:
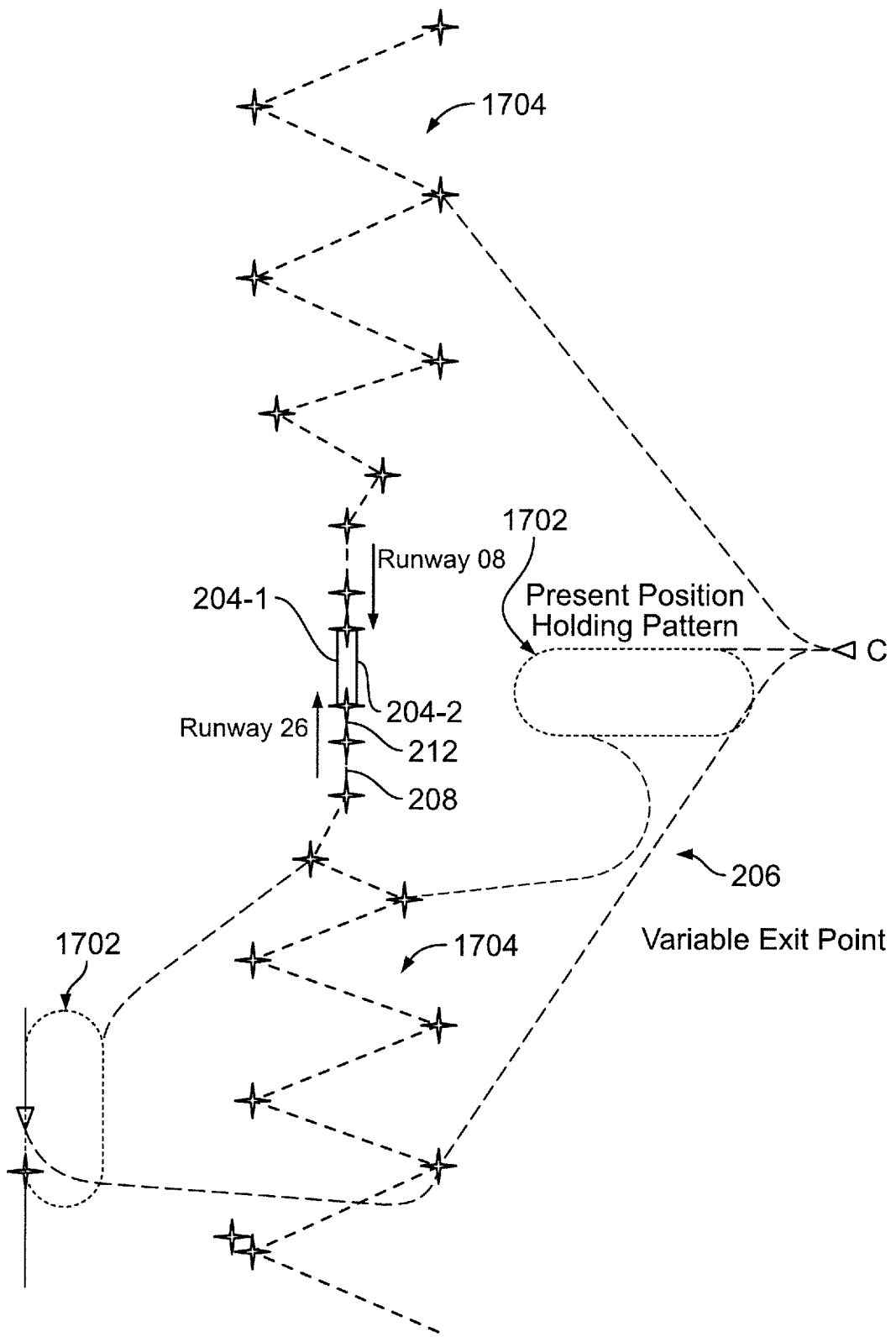
FIG. 17 depicts examples of multiple driftdown segment intercept options.

With reference now to FIG. 17, this figure depicts three example options from aircraft position C and two example options from aircraft position D. Either runway 204-1, 204-2 is accessible, but a third option exists that involves an initial holding pattern 1702. The holding pattern 1702, as noted above, allows the aircraft to circle down before intercepting the S-turn pattern 1704, thus allowing the aircraft to stay closer to the airport. The aircraft system 100 will enable multiple loops in the holding pattern 1702 and allows the pilot to exit at any time. Upon exiting the holding pattern 1702, the aircraft system 100 chooses the most appropriate point of intercept on the S-turn pattern 1704.

As the aircraft reduces altitude in the holding pattern 1702, the S-turn pattern intercept point will move further into the S-turn pattern 1704. The aircraft system 100 will monitor the energy margin while in the holding pattern 1702 and will not allow the aircraft to continue in the holding pattern 1702 unless adequate energy margin is present to reach the deceleration segment 208. The aircraft system 100 will cue the pilot to exit before the minimum energy state is reached.

Initial aircraft position may not be close to the S-turn pattern 1704. In this case, the aircraft system 100 may calculate an intercept path to the S-turn pattern 1704 that carries the aircraft further away from the airport. If the pilot does not want to travel further from the runway 204, they may opt to manually modify the flight path.

At the time of engine thrust loss, there are multiple factors that determine the best method to choose, mainly for the driftdown segment 206, but also for final approach 212 and deceleration segments 208. These include altitude, distance from runway, winds and heading among other factors. As the energy condition increases, the aircraft system 100 will select the method most appropriate for the flight condition. In a minimum energy condition, the aircraft system 100 will construct a direct path to the deceleration segment 208. As energy increases, the aircraft system 100 will extend the return path along the runway centerline 402. When this distance along the centerline 402 exceeds a certain value, the aircraft system 100 will switch to a S-turn and/or holding pattern approach. The "certain value" may vary from aircraft-to-aircraft, flight-to-flight, and situation-to-situation.

Figure 18:
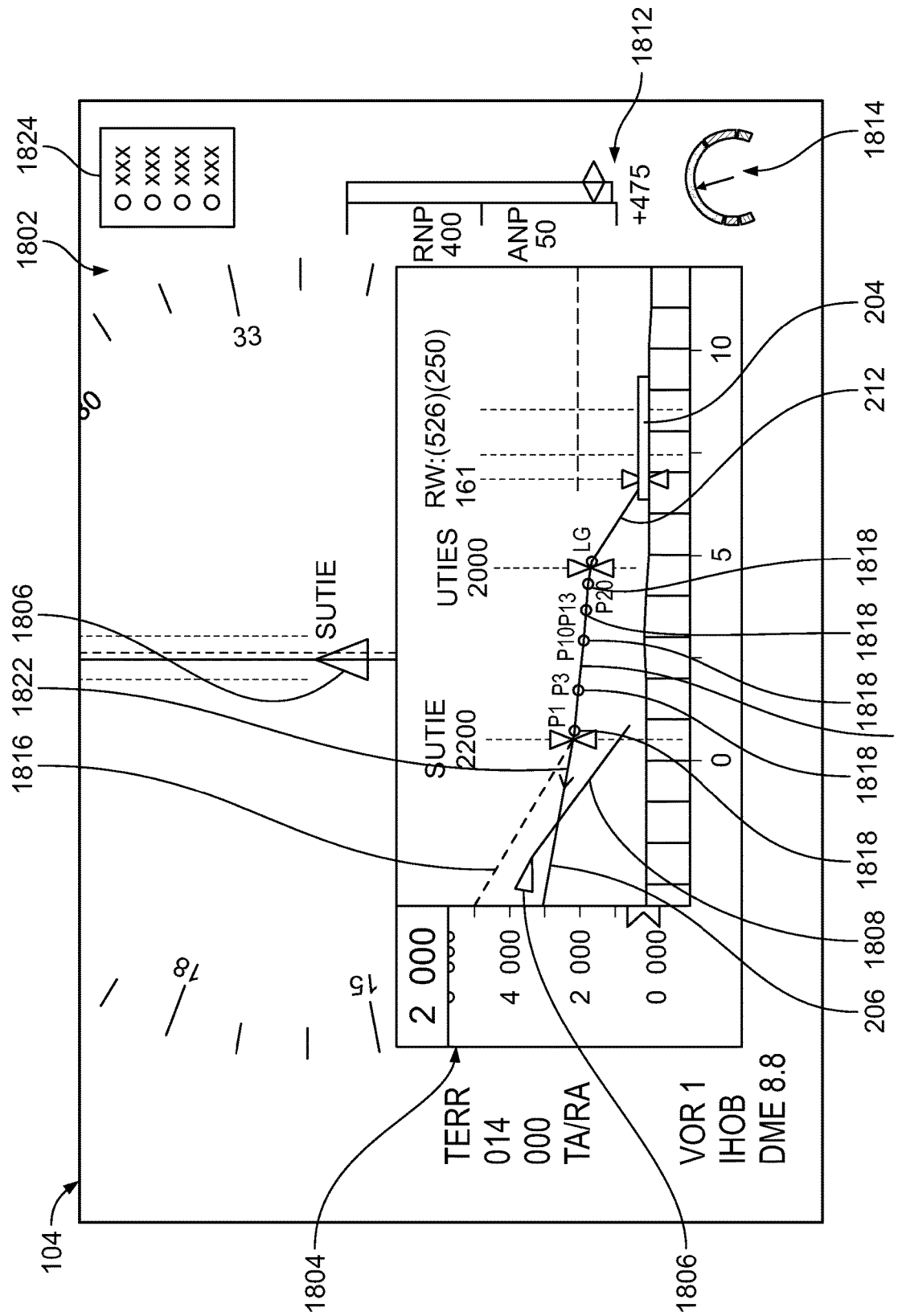
FIG. 18 depicts an example display that may be rendered by the system of FIG. 1.

With reference now to FIG. 18, it was noted above that the display system 110 may command the display device 104 to render various displays including, for example, a horizontal situation display 1802 and a vertical situation display 1804. As is generally known, the horizontal situation display 1802 is a top-down view of the aircraft and its current and planned lateral flight path, and the vertical situation display 1804 is a vertical profile view of the aircraft and its current and planned vertical flight path. When a complete loss of engine thrust event is detected, the display device 104 may also be commanded to render various other graphical elements. These additional elements will now be described.

As FIG. 18 depicts, the vertical situation display 1804 includes at least an aircraft icon 1806 and the vertical portion of the complete path 200 (e.g., the driftdown segment 206, the deceleration segment 208, and the final approach segment 212). This provides the pilot with the vertical position of the aircraft 102 with respect to the vertical path 200, which gives the pilot a quick visual indication of the current energy condition of the aircraft 102. The display device 104 may also include additional graphical elements to monitor and, if necessary, manually fly the aircraft 102, during the total loss of engine thrust event. These additional graphical elements may include one or more of a vertical trend indicator 1808, a vertical deviation indicator 1812, a total energy indicator 1814, a speed brake authority limit 1816, flap extension cues 1818, a path capture zone 1822, and a landing solutions indicator 1824.

The vertical trend indicator 1808 extends forward from the aircraft icon 1806 and represents the current vertical vector of the aircraft 102. The vertical deviation indicator 1812 indicates the vertical margin (in feet) above the path 200. As depicted on the currently illustrated display device 104, the vertical margin is +475 feet. That is, the aircraft 102 is currently 475 feet above the path 200.

Before proceeding further, it should be appreciated that the combination of the vertical path 200, the relative position of the aircraft icon 1806, the vertical trend indicator 1808, and the vertical deviation indicator 1812 provide the pilot with a general indication of the instantaneous energy margin. In general, if the aircraft 102 (as indicated by the aircraft icon 1806) is above the path 200, and the vertical trend indicator 1808 is tracking parallel to the path, the energy condition will be satisfactory. As already noted, the primary purpose of the driftdown segment 206 is to maximize flight time, but just as importantly, the aircraft must conserve enough energy to finish the driftdown segment 206 before entering the deceleration segment 208.

If winds are steady, these graphical elements 1806, 1808, 1812 will do a good job of representing the current energy condition and indicate whether the general trend of energy is increasing or decreasing based on the angle of the vertical trend indicator 1808 relative to the path 200. However, if winds are shifting and changing in magnitude, these graphical elements may not provide sufficiently accurate energy state information to the pilot. For example, when the aircraft 102 is flying above the path 200, in speed on elevator mode, a change in winds, such as a headwind shear, will cause the indicated airspeed to increase. To correct for this overspeed condition, the aircraft system 100 (e.g., the FMS 116) will command the aircraft 102 to pitch-up to reduce the speed back toward the target. In this condition, the vertical trend indicator 1808 will rotate upward, indicating that vertical speed is becoming more positive. The aircraft icon 1806 may be rendered at an increased distance above the vertical path 200, appearing to the pilot to be an increase in aircraft energy, and the vertical deviation indicator 1812 may also show a higher altitude above the path 200. This, too, can be potentially misleading. This is because the aircraft 102 has gained vertical margin above the path 200, but the aircraft ground speed has been reduced by the amount of the headwind shear. This creates a situation where proportionally more vertical energy is required to travel the same lateral distance. This condition can eventually result in a low energy state later in the driftdown segment 206. This, at least in part, is why the total energy indicator 1814 is rendered.

The total energy indicator 1814 is continuously updated by the aircraft system 100. In doing so, the aircraft system 100 considers current wind conditions and the remaining portion of the path 200 to the runway. The aircraft system 100 can identify any potential energy problems and display this on the total energy indicator 1814.

Figure 19:
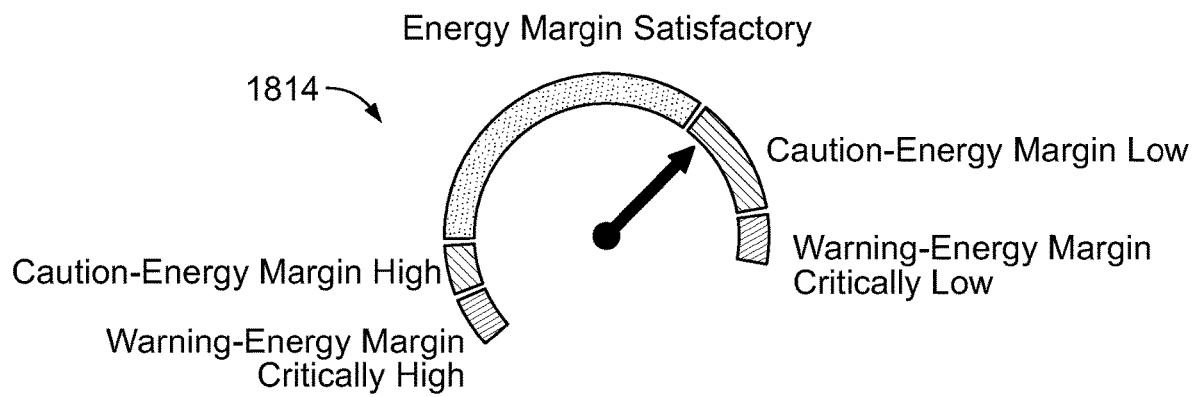
FIGS. 19-21 depict examples of a total energy indicator that may be rendered on the display of FIG. 18.
Figure 20:
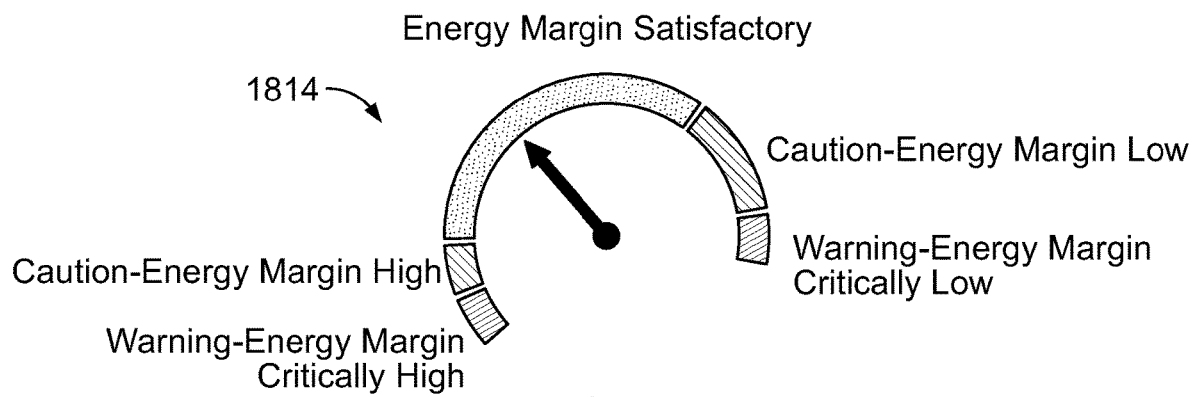
Figure 21:
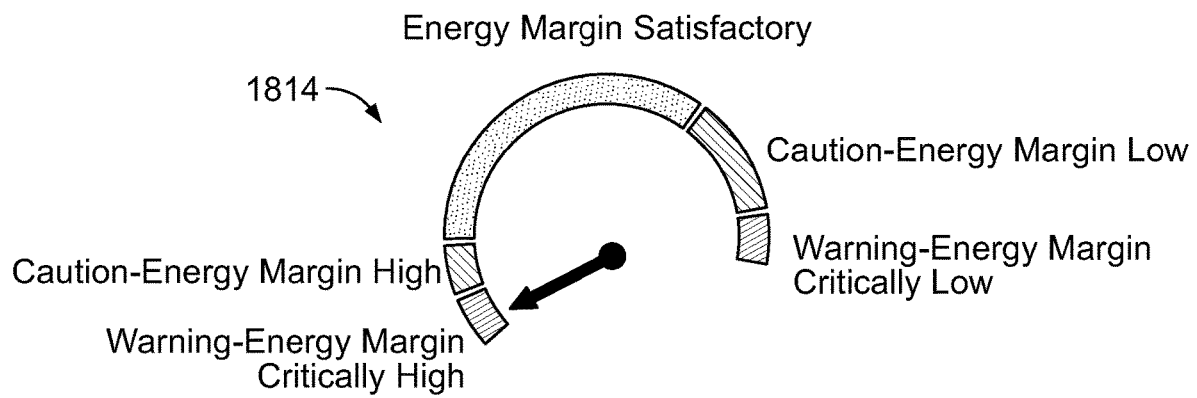

The total energy indicator 1814, which is depicted more clearly in FIGS. 19-21, displays the instantaneous energy state of the aircraft 102, as determined by the aircraft system 100. The aircraft system 100 calculates a predicted crossing altitude at the end of the driftdown segment 206, unaided by speed brakes. If the aircraft 102 has enough energy to cross this point above a minimum specified altitude, the total energy indicator 1502 will show a satisfactory reading in a first color, such as green. If the predicted altitude is below a minimum threshold, it will indicate Caution—Energy Margin Low (in a second color, such as yellow), or Warning—Energy Margin Critically Low (in a third color, such as red). If the predicted crossing altitude is higher than a max threshold, it will indicate a high energy state as Caution—Energy Margin High (in the second color) or Warning—Energy Margin Critically High (in the third color). This can serve as a cue to the pilot that an energy recovery or energy reduction maneuver may be required. For example, if the aircraft 102 is flying in a holding pattern and an energy recovery maneuver is needed, the pilot could exit early. Or, if the aircraft is flying an S-turn pattern, the pilot could fly direct to a down path waypoint. These maneuvers will increase the energy margin. Conversely, if, for example, a tailwind shear increases aircraft ground speed, resulting in a high energy condition, the pilot could use the speed brakes to slow the aircraft, so long as the speed brake authority limit 1816 is not exceeded.

Returning now to FIG. 18, in the depicted embodiment, the speed brake authority limit 1816 is rendered as a broken line drawn above the vertical path 200. The speed brake authority limit 1816 indicates the maximum altitude above the path 200 where full speed brakes can return the aircraft 102 to the path 200 before the start of the deceleration segment 208.

As previously described, the flap extension cues 1818 are determined by the aircraft system 100 as part of the deceleration segment 208 determination process. The flap extension cues 1818 may be variously rendered. In the depicted embodiment, the flap extension cues 1818 are rendered as bubbles, superimposed on the lateral and vertical path 20 (only the vertical path visible in FIG. 18). Each flap extension cue 1818 is labeled with the corresponding flap setting. When the aircraft 102 reaches a flap extension cue, that is the cue for the pilot to deploy that flap setting.

The path capture zone 1822 is rendered at the end of the driftdown segment 206 and represents a distance in a unique color or format. The path capture zone 1822 may be displayed on one or both of the vertical situation display 1804 and the horizontal situation display 1802. Entry into the path capture zone 1822 indicates to the pilot that it is time to intercept and control to the vertical path 200 of the driftdown segment 206. Speed brakes may be used to perform this, along with vertical speed or speed intervention controls. The length of this zone is variable and may be updated to indicate a half speed brake intercept of path 200.

The landing solutions indicator 1824 shows the pilot how many runway solutions are currently available for selection. This indicator may be visible at all times. If the number of landing solutions is one or more, the indication will be rendered in a visually distinguishable color (e.g., green). The landing solutions indicator 1824 will indicate the total number of available landing solutions computed by the aircraft system 100. If no solutions are available, then the indication will be blank. The landing solutions indicator 1824 serves as a quick GO/NOGO decision for the pilot. In the depicted embodiment, four runway solutions are currently available for selection.

The aircraft system 100, as already noted, is configured to calculate landing solutions for a single runway, multiple runways at an airport, or multiple runways at multiple airports. The landing solutions are provided, via the landing solutions indicator 1824, to the pilot for selection in the event of a complete loss of engine thrust. In some embodiments, the aircraft system 100 will command the landing solutions indicator 1824 to display the possible options sorted in a specific order of importance to the flight crew. Factors such as energy margin, winds, airport facilities, time aloft, runway length, etc. can be specified by an operator (e.g., pilot) to affect the ordering priority of landing solutions.

Each of the landing solutions is determined based on current aircraft conditions. This way, the solutions are available to the pilot immediately in the event of a loss of engine thrust. Landing solutions may also be made available during a single engine out condition where thrust is still available. For example, the loss of one engine on a dual engine aircraft. This method will allow the pilot to monitor diversion runways in the event that all engines are lost. Preferably, a landing solution will only be made available for pilot selection if all criteria are met. This may include, but is not limited to: adequate energy margin, proper clearance from terrain, and adequate destination runway length.

Figure 22:
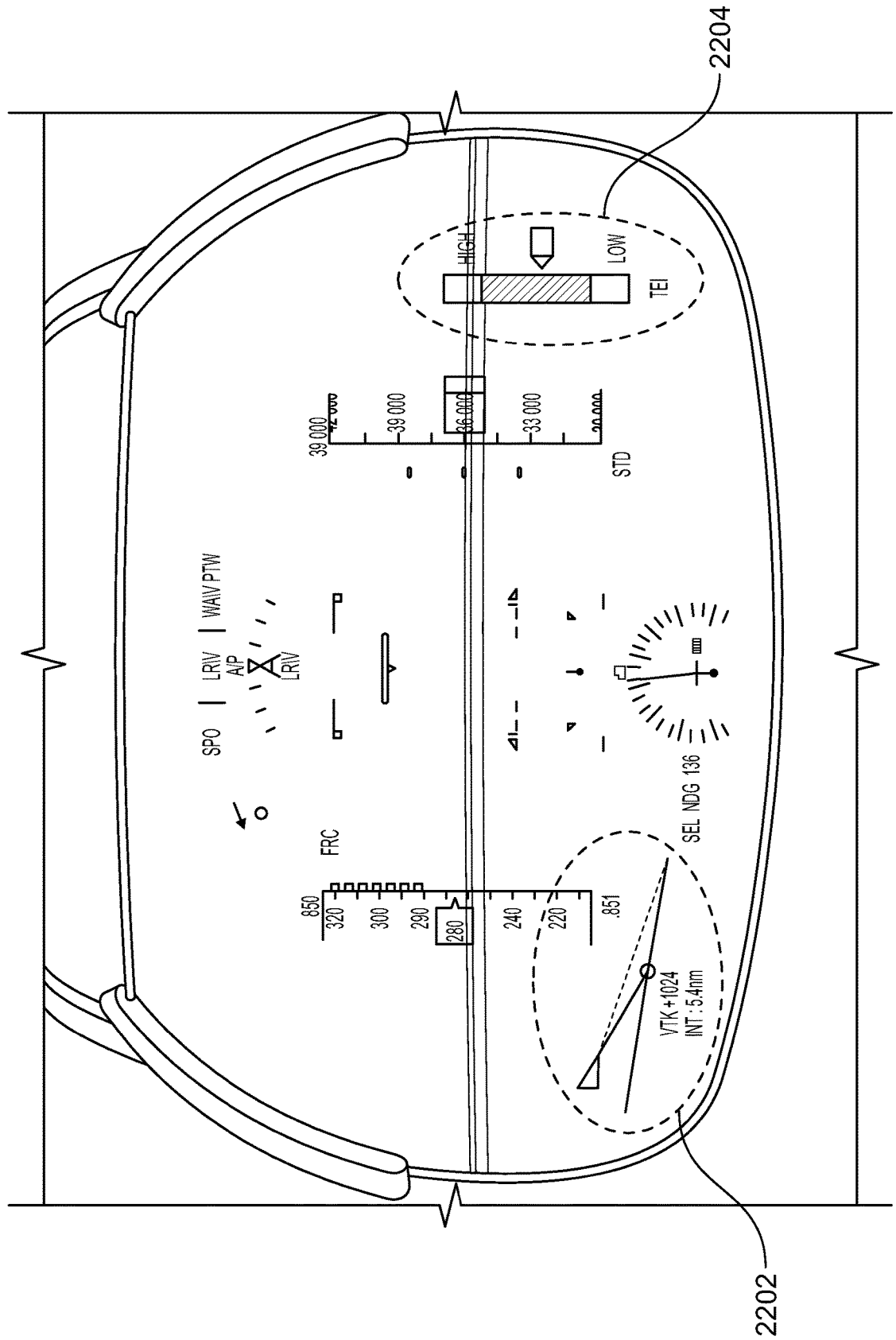
FIG. 22 depicts an example head-up display.

The display device 104 may also, or instead, by implemented as a head-up display. This enables the pilot to their keep eyes outside of the aircraft 102 while having immediate access to critical information. As FIG. 22 depicts, one example of the head-up display may render at least a portion of the vertical path 2202 and an embodiment of the total energy indicator 2204.

Example Scenario

In the highly unlikely event of a complete loss of engine thrust, the pilot would first check the number of landing solutions available. Preferably, the landing solutions will be displayed in a rank order manner, with the best solutions at the top. Selection and activation is made available to the pilot, designed for minimal time and effort. For example, one key press to select a landing solution, and one to two key press to activate the solution.

Once the landing solution is activated by the pilot, the autopilot can then be engaged to control laterally and vertically. If the pilot chooses to fly manually, they can use the aircraft system for visual cues and assistance.

As the aircraft progresses down the path 200 toward the runway 204, the pilot will monitor the current energy condition of the aircraft 102 and make adjustments as necessary. If energy is too high, the pilot may choose to deploy speed brakes, enter a holding pattern, revert to manual vertical speed, or increase the speed target while in speed on elevator control. If energy is too low, the pilot may choose to manually change aircraft heading to reduce the lateral distance flown. Direct modifications to the computed flight plan will also be supported.

In addition, as the aircraft 102 progresses down the path 200 toward the runway 204, the one or more user interfaces 106 may be used to allow the pilot to manually enter current winds reported winds for the target runway 204. This wind information may be sourced from an ATIS report or uplinked to the aircraft 102 on datalink. If, for instance, the reported runway winds have a higher headwind component than originally assumed by the aircraft system 100, the aircraft system 100 can make modifications to the path 200 to accommodate the change in winds. This may include shortening the driftdown segment 206, and/or changes to the deceleration segment 208, such as a shorter distance D or a higher angle A (see FIG. 5).

In addition to monitoring and managing the energy condition, the pilot will also monitor the altitude of the aircraft 102 with respect to the speed brake authority limit 1816. The aircraft 102 should be flown in a manner that does not allow it to rise above this limit. Failure to remain under this limit can result in an overspeed or above path entry into the deceleration segment 208.

As the aircraft approaches the deceleration segment 208, the aircraft system 100 provides cues to the pilot that it is time to join the vertical profile. Once controlling to the deceleration segment 208, the pilot may see the flap extension cues 1818 on the display. When the aircraft reaches a flap extension cue 1818, the pilot will extend the flaps to the indicated setting.

When sequencing onto the final approach segment 212, the aircraft system 100 will provide a cue to that it is time to extend the landing gear. At an appropriate point of the final approach segment 212, the pilot will, if not done already, disconnect the autopilot and manually land the aircraft 102.

The system and method described herein applies to any powered fixed wing aircraft. Propeller or turbine engine, one engine to four engines. The aircraft must be equipped with a processing system that has access to aircraft state information such as position, altitude, airspeed data, among others.

Each segment 206, 208, 212 is designed in way that offers some level of flexibility in energy management while flying the return path to the runway. The most unpredictable factor is winds. The design of the driftdown segment 206 in a moderate energy condition is built centric to the runway centerline extension. This allows the pilot to manually bypass sections of the computed path if they desire to increase the energy margin. In the case of a high energy driftdown segment 206, the pilot may choose to skip some segments of the S-turns in order to increase the energy margin. If the return path is initiated with a holding pattern, the pilot may opt to exit early in order to increase energy margin.

The deceleration segment 208 may be changed before and during flight on the segment. Before reaching the deceleration segment 208, the aircraft system 100 may reduce or increase the distance, or increase or reduce the angle. While flying the deceleration segment 208, the aircraft system 100 may modify the placement of flap extension cues to ensure that the aircraft reaches the final approach segment 212 with adequate airspeed.

On the final approach segment 212, the pilot may choose to delay extension of the landing gear until progressing further down the segment 212. Based on minimum gear extension time for a particular airframe, the display device 104 may render the latest point where the pilot must extend the landing gear.

The aircraft system 100 initially constructs the path 200 for maximum time aloft and a safe initial energy margin, with the safe return of the aircraft being the top priority. If factors change that may reduce the energy margin below an acceptable value, the methods above may be used to compensate for the loss of energy.

There may also be cases where the pilot desires to return to the runway as quickly as possible. The aircraft system 100 allows the pilot to see the effects of a modification before it is accepted for use. For example, if flying the S-turns of the driftdown segment 206, the pilot may choose to modify the path directly to the deceleration segment 208. This will result in an increase in energy margin. The pending change would be shown on the display device 104, including the speed brake authority limit 1814, so the pilot can decide whether this modification will remain within the capabilities of the aircraft.

The system may support other functions to aid in the effectiveness of the landing solution. For example, in some cases, a landing after engine failure could result in an overweight landing due to high fuel load. As a potential feature, the aircraft system 100 may also be configured to compute a point at the far end of the selected runway and transmit the point to an auto braking system. The braking system can then provide the appropriate braking required to stop the aircraft in as long of a distance as possible. This may help to reduce brake overheating and a potential brake fire.

During a loss of thrust condition, it is of high priority to start the APU if it was not already running. Based upon the airframe specifications, the aircraft system 100 may also be configured to command the display of information, such as a specified APU starting altitude, superimposed on the vertical situation display 1804 or other display. For a given engine model, there may be a specified best airspeed for restart. The ram air turbine, if included, may also be used on certain aircraft to provide electrical or hydraulic energy. The ram air turbine increases aircraft drag, and the aircraft system 100 may also be configured to modify the construction of the path to accommodate the additional drag.

For the sake of brevity, conventional techniques related to approach procedures, aerodynamics, aircraft modeling, graphics and image processing, avionics systems, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method for determining a lateral and vertical path for aircraft guidance from a current aircraft position to a landing runway following a complete loss of engine thrust, the method comprising the steps of:
    determining, in a processing system, a final approach segment, the final approach segment being a path that the aircraft will traverse to maintain aircraft speed at a controlled landing speed, with no engine thrust, until the aircraft touches down on the landing runway;
    determining, in the processing system, a deceleration segment, the deceleration segment being a path that the aircraft will traverse, just prior to entering the final approach segment, to reduce the aircraft speed, with no engine thrust, to the controlled landing speed;
    determining, in the processing system, a driftdown segment, the driftdown segment being a path that the aircraft will traverse, upon the complete loss of engine thrust and just prior to entering the deceleration segment, to reduce aircraft potential energy to a predetermined magnitude;
    connecting, in the processing system, the driftdown segment to the deceleration segment, and the deceleration segment to the final approach segment, to form a complete lateral and vertical path from the current aircraft position to the landing runway;
    rendering, on a display device, a graphical representation of the complete lateral and vertical path from the current aircraft position to the landing runway, wherein the graphical representation of the complete lateral and vertical path updates as the aircraft travels; and
    using a flight management system to automatically command the aircraft to fly the complete path.

2. The method of claim 1, wherein a plurality of landing runways are available following the complete loss of engine thrust, and wherein the method further comprises:
  forming a plurality of complete lateral and vertical paths, each of the complete lateral and vertical paths extending from the current aircraft position to a different one of the landing runways; and
  rendering, on the display device, a graphical representation of each of the complete lateral and vertical paths.

3. The method of claim 1, wherein:
  the final approach segment aligns the aircraft with landing runway and slopes upward, at a first angle, from a first point to a second point, and for a first horizontal distance;
  the first point is an altitude above a start end of the landing runway; and
  the first horizontal distance is measured from the start end of the landing runway.

4. The method of claim 3, further comprising:
  rendering, on the display device, a cue to extend aircraft landing gear after sequencing onto the final approach segment.

5. The method of claim 3, wherein:
  the deceleration segment slopes upward, at a second angle, from the second point to a third point, and for a second horizontal distance; and
  the second horizontal distance is measured from the second point.

6. The method of claim 5, wherein the aircraft is controlled at or above maximum lift-to-drag airspeed upon entry to the deceleration segment.

7. The method of claim 1, further comprising:
  determining at what points along the deceleration segment that flaps should be extended and to what flap settings the flaps should be extended; and
  rendering, on the display device, graphical representations of flap extension cues at the points on the deceleration segment, the flap extension cues including the flap settings.

8. The method of claim 1, further comprising:
  processing, in the processing system, at least aircraft weight, aircraft altitude, temperature, aircraft airspeed, current wind speed and direction to, at least in part, determine the final approach segment, the deceleration segment, and the driftdown segment.

9. The method of claim 1, wherein:
  the driftdown segment includes a lateral path portion and a vertical path portion;
  the aircraft is flown above the vertical path portion; and
  the lateral path portion includes one or more of: a holding pattern, an S-turn pattern, and an S-turn intercept pattern.

10. A system for determining a lateral and vertical path for aircraft guidance from a current aircraft position to a landing runway following a complete loss of engine thrust, the system comprising:
  a display device; and
  a processing system in operable communication with the display device, the processing system configured to:
    determine a final approach segment, the final approach segment being a path that the aircraft will traverse to maintain aircraft speed at a controlled landing speed, with no engine thrust, until the aircraft touches down on the landing runway;
    determine a deceleration segment, the deceleration segment being a path that the aircraft will traverse, just prior to entering the final approach segment, to reduce the aircraft speed, with no engine thrust, to the controlled landing speed;
    determine a driftdown segment, the driftdown segment being a path that the aircraft will traverse, upon the complete loss of engine thrust and just prior to entering the deceleration segment, to reduce aircraft potential energy to a predetermined magnitude;
    connect the driftdown segment to the deceleration segment, and the deceleration segment to the final approach segment, to form a complete lateral and vertical path from the current aircraft position to the landing runway; and
    command the display device to render a graphical representation of the complete lateral and vertical path from the current aircraft position to the landing runway, wherein the graphical representation of the complete lateral and vertical path updates as the aircraft travels.

11. The system of claim 10, wherein a plurality of landing runways are available following the complete loss of engine thrust, and wherein the processing system is further configured to:
  form a plurality of complete lateral and vertical paths, each of the complete lateral and vertical paths extending from the current aircraft position to a different one of the landing runways; and
  command the display device to a graphical representation of each of the complete lateral and vertical paths.

12. The system of claim 10, further comprising:
  a flight management system in operable communication with the processing system and configured to automatically command the aircraft to fly the complete path.

13. The system of claim 10, wherein:
  the final approach segment aligns the aircraft with landing runway and slopes upward, at a first angle, from a first point to a second point, and for a first horizontal distance;
  the first point is an altitude above a start end of the landing runway; and
  the first horizontal distance is measured from the start end of the landing runway.

14. The system of claim 13, further comprising:
  rendering, on the display device, a cue to extend aircraft landing gear after sequencing onto the final approach segment.

15. The system of claim 13, wherein:
  the deceleration segment slopes upward, at a second angle, from the second point to a third point, and for a second horizontal distance; and
  the second horizontal distance is measured from the second point.

16. The system of claim 15, wherein the aircraft is controlled at or above maximum lift-to-drag airspeed upon entry to the deceleration segment.

17. The system of claim 10, wherein the processing system is further configured to:
  determine at what points along the deceleration segment that flaps should be extended and to what flap settings the flaps should be extended; and
  command the display device to render graphical representations of flap extension cues at the points on the deceleration segment, the flap extension cues including the flap settings.

18. The system of claim 10, wherein the processing system is further configured to process at least aircraft weight, aircraft altitude, temperature, aircraft airspeed, current wind speed and direction to, at least in part, determine the final approach segment, the deceleration segment, and the driftdown segment.

19. The system of claim 10, wherein:
- the driftdown segment includes a lateral path portion and a vertical path portion;
- the aircraft is flown above the vertical path portion; and
- the lateral path portion includes one or more of: a holding pattern, an S-turn pattern, and an S-turn intercept pattern.

* * * * *